(12) United States Patent
Kadnikov et al.

(10) Patent No.: US 9,975,387 B2
(45) Date of Patent: May 22, 2018

(54) TRAILER COUPLING AND LOAD CARRIER ARRANGEMENT FOR A TRAILER COUPLING

(71) Applicants: Aleksej Kadnikov, Leonberg (DE); Wolfgang Gentner, Steinheim (DE); Bernhard Rimmelspacher, Rheinstetten (DE)

(72) Inventors: Aleksej Kadnikov, Leonberg (DE); Wolfgang Gentner, Steinheim (DE); Bernhard Rimmelspacher, Rheinstetten (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days. days.

(21) Appl. No.: 14/162,070

(22) Filed: Jan. 23, 2014

(65) Prior Publication Data
US 2014/0210186 A1 Jul. 31, 2014

(30) Foreign Application Priority Data
Jan. 25, 2013 (DE) .................. 10 2013 100 780

(51) Int. Cl.
B60D 1/06 (2006.01)
(52) U.S. Cl.
CPC .................... B60D 1/065 (2013.01)
(58) Field of Classification Search
CPC ................... B60D 1/06; B60D 1/065
USPC ............................. 280/512, 513
See application file for complete search history.

(56) References Cited

U.S. PATENT DOCUMENTS

| 2,523,500 | A | 9/1950 | Davey et al. |
| 4,209,184 | A | 6/1980 | Byers |
| 2005/0205629 | A1 | 9/2005 | Wang |
| 2007/0187448 | A1 | 8/2007 | Dongiovanni et al. |

FOREIGN PATENT DOCUMENTS

| DE | 9305689 U1 | 7/1993 | |
| DE | 43 15 292 A1 | 11/1994 | |
| DE | 20 2005 011 444 U1 | 12/2006 | |
| DE | 10 2008 009 150 A1 | 9/2009 | |
| DE | 20 2010 007 974 U1 | 1/2011 | |
| DE | 10 2011 004 653 A1 | 8/2011 | |
| EP | 1184212 A2 * | 3/2002 | ............... B60D 1/06 |
| EP | 2 258 567 A1 | 12/2010 | |
| EP | 2361808 A2 * | 8/2011 | ............... B60R 9/06 |
| EP | 2 759 421 A2 | 7/2014 | |
| WO | WO 82/00119 A1 | 1/1982 | |

OTHER PUBLICATIONS

DE 20 2005 011 444 U1 Machine Translation.*

* cited by examiner

Primary Examiner — Joseph M Rocca
Assistant Examiner — Felicia L. Brittman
(74) Attorney, Agent, or Firm — Reinhart Boerner Van Deuren P.C.

(57) ABSTRACT

In order to improve a trailer coupling for motor vehicles comprising a ball neck, which is mountable at a first end on a rear part of a motor vehicle to be fixed to the vehicle by means of a ball neck holder and which carries a coupling ball at a second end, in such a manner that load carriers can be mounted and securely held in a simple manner, it is proposed that at least one positioning body is arranged on the ball neck at a defined spacing from the coupling ball to position a load carrier holding arrangement attachable to the coupling ball and the ball neck.

40 Claims, 18 Drawing Sheets

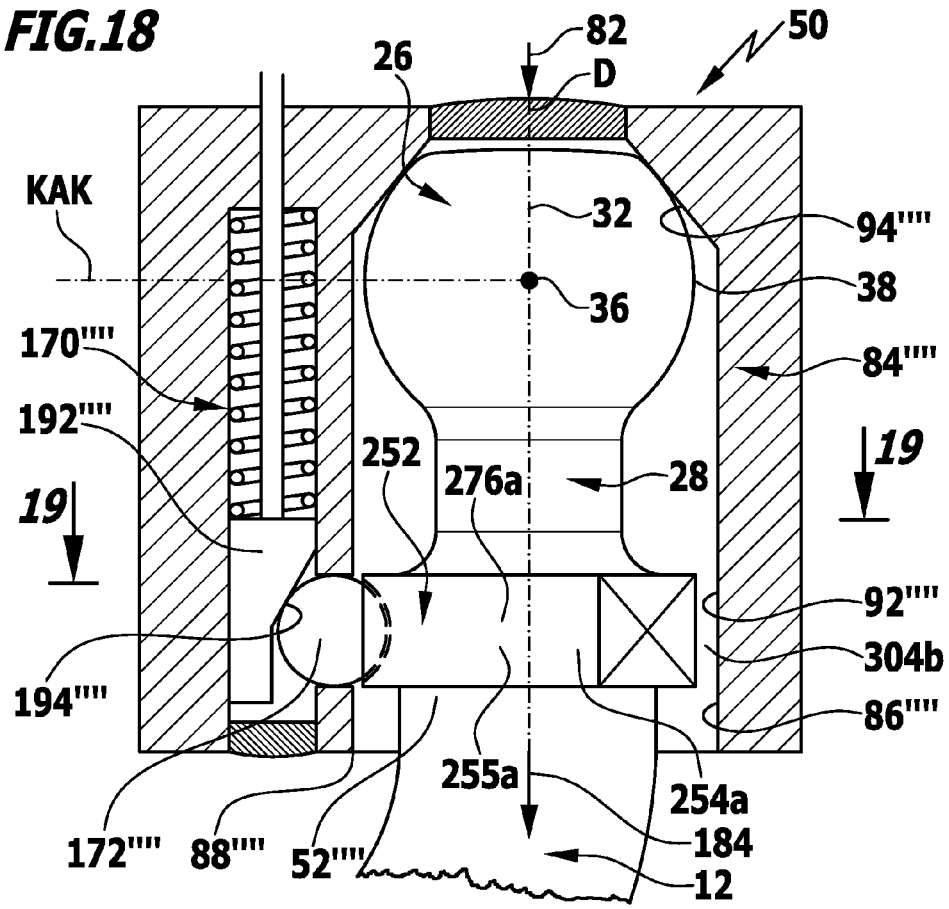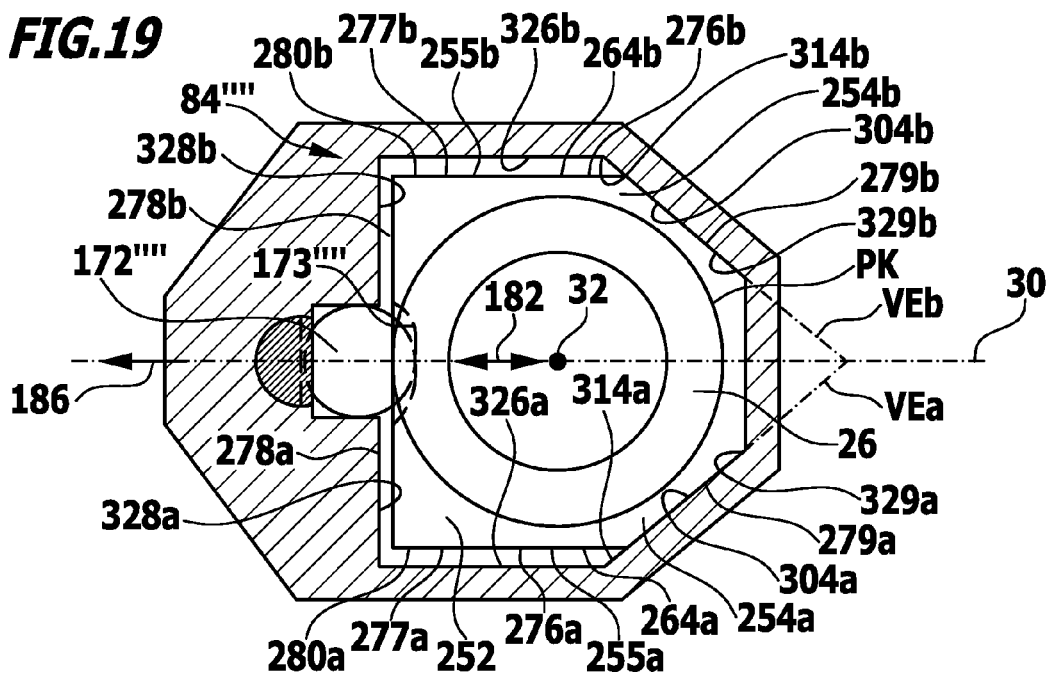

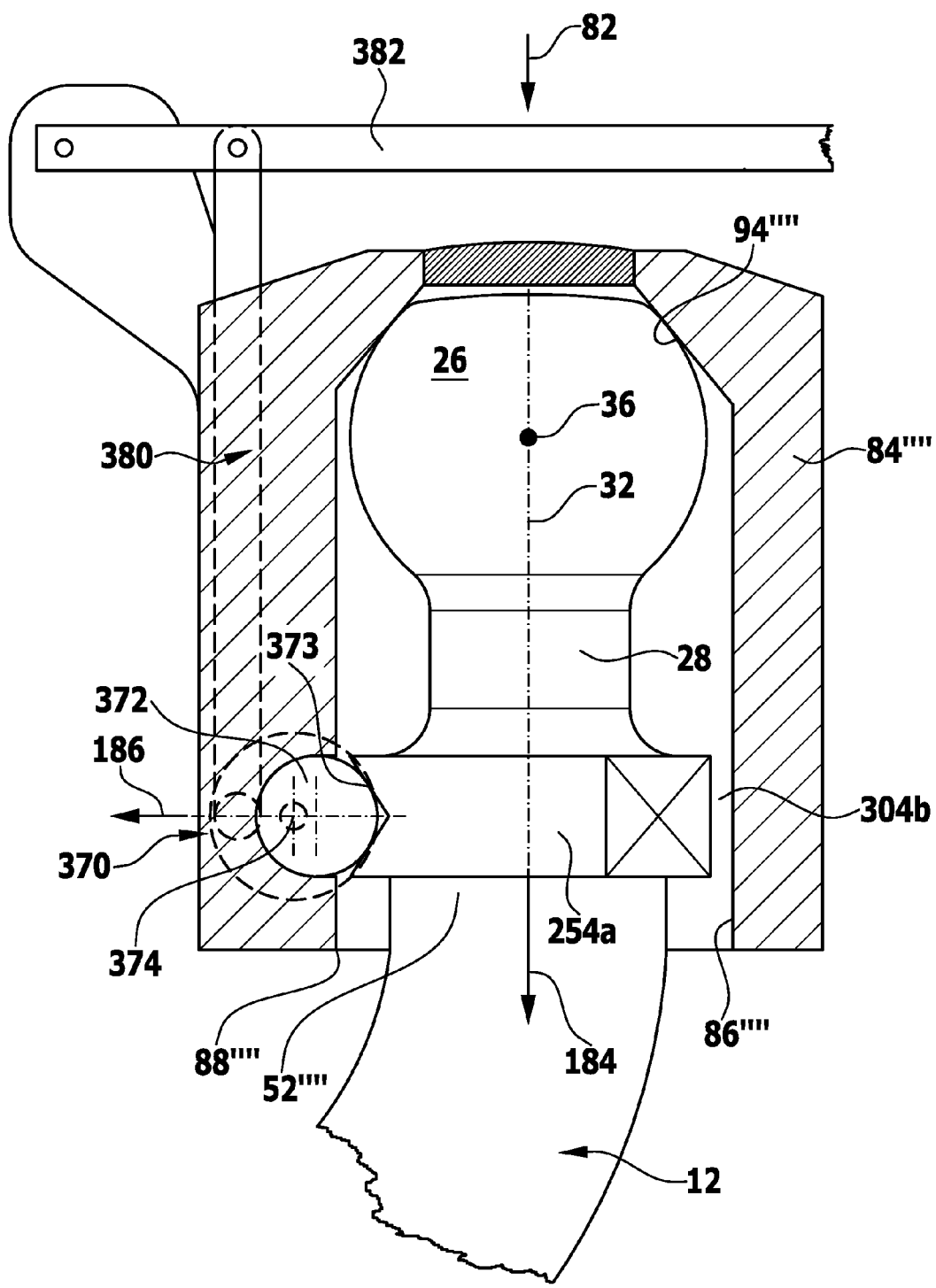

TRAILER COUPLING AND LOAD CARRIER ARRANGEMENT FOR A TRAILER COUPLING

CROSS-REFERENCE TO RELATED PATENT APPLICATION

This patent application claims the benefit of German application No. 10 2013 100 780.5, filed Jan. 25, 2013, the teachings and disclosure of which are hereby incorporated in their entirety by reference thereto.

BACKGROUND OF THE INVENTION

The invention relates to a trailer coupling for motor vehicles comprising a ball neck, which is mountable at a first end on a rear part of a motor vehicle to be fixed to the vehicle by means of a ball neck holder and which carries a coupling ball at a second end.

Such trailer couplings are known from the prior art.

Such trailer couplings primarily serve to attach a trailer that engages on the coupling ball with a tow ball coupling.

However, a trailer coupling often also serves to mount a load carrier, e.g. for bicycles or skis or other sporting equipment, to enable these to be easily transported.

Therefore, the object forming the basis of the invention is to improve a trailer coupling of the above-described type in such a manner that load carriers can be mounted and securely held in a simple manner.

SUMMARY OF THE INVENTION

This object is achieved according to the invention with a trailer coupling of the above-described type in that at least one positioning body is arranged on the ball neck at a defined spacing from the coupling ball to position a load carrier holding arrangement attachable to the coupling ball and the ball neck.

The advantage of the solution according to the invention lies in that such a positioning body provides the possibility of positioning, i.e. aligning, the load carrier holding arrangement in a simple manner relative to the ball neck and holding it in the aligned position.

In connection therewith, the positioning of the load carrier holding arrangement is also achieved in particular by supporting this on the coupling ball so that the positioning of the load carrier holding arrangement occurs, on the one hand, by supporting it on the coupling ball and, on the other hand, by supporting it on the positioning body.

In principle, a substantial degree of freedom is given with respect to the arrangement of the positioning body on the ball neck, so that the positioning body could theoretically be arranged on any location of the ball neck.

A particularly favourable solution provides that the positioning body is arranged on a ball neck section of the ball neck which adjoins a ball attachment piece of the ball neck that carries the coupling ball.

Such an arrangement of the positioning body has the advantage that it is thus possible in the case of a very large number of shapes of the ball neck to always arrange the positioning body at the same defined spacing from the coupling ball, and substantially irrespective of the shape of the ball neck, in particular of a bend thereof, and maintain a standardised position of the positioning body relative to the coupling ball.

No further details have as yet been given in this case with respect to the configuration of the positioning body.

Thus it is preferably provided that the positioning body extends transversely to a course of the ball neck section carrying this positioning body, i.e. that working from a course of the ball neck or the ball neck section the positioning body sits thereon or projects therefrom or completely or partially encloses the ball neck section.

In this case, the positioning body can be a separate body, which is connected to the ball neck section by mounting elements or is held on the ball neck section by interlocking.

However, it is also conceivable that the positioning body is moulded onto the ball neck section, e.g. is moulded in one piece thereon as a build-up of material or a thickened section, for example.

It is particularly favourable with respect to the configuration of the positioning body if the positioning body bears at least one positioning face, by means of which a positioning of the load carrier holding arrangement can be achieved.

For example, it is provided for this that the at least one positioning face lies outside a projection contour of the coupling ball, which is formed by projection of the coupling ball onto the positioning body.

The projection of the coupling ball on the positioning body preferably occurs parallel to an attachment direction, in which the load carrier holding arrangement is movable in order to attach this onto the coupling ball and the ball neck.

In particular, the attachment direction runs approximately parallel to a ball centre axis of the coupling ball, wherein an approximately parallel course of the attachment direction to the ball centre axis is understood to mean that the angle between the ball centre axis and the attachment direction is equal to or smaller than 20°, preferably equal to or smaller than 20°, even better equal to or smaller than 10°, wherein an easily conceivable solution envisages a parallel course.

In addition, it is preferably provided that the attachment direction runs parallel to a longitudinal centre plane of the ball neck and/or parallel to a transverse plane, which is oriented perpendicularly to a longitudinal centre plane of the ball neck.

This means that the positioning face is respectively arranged at such a spacing from the ball neck or the ball neck section that it lies outside the projection contour of the coupling ball on the positioning body and is thus easily available for positioning of the load carrier holding arrangement when the load carrier holding arrangement is attached to the coupling ball, i.e. engages over or around the coupling ball to be supported on the coupling ball.

In particular, there is thus the simple possibility of configuring the load carrier holding arrangement in such a manner that a ball seat can be attached to the coupling ball or engages around this and in this case an interaction with the positioning faces of the positioning body is possible without impairing access to the ball seat in order to support the load carrier holding arrangement on the at least one positioning face of the positioning body.

No further details have been given in association with the previous explanation of the individual embodiments with respect to the configuration of the positioning face.

Thus, a particularly favourable solution provides that the positioning face has at least one guide face region, which runs parallel to an attachment direction of the load carrier holding arrangement.

Moreover, no further details have been given with respect to the arrangement of the at least one positioning face on the positioning body in association with the previous explanation of the individual embodiments.

Thus an advantageous solution provides that the positioning face is arranged in an internal space of the positioning body, e.g. in a bore or in an interior enclosed by the positioning body.

Another advantageous solution provides that the at least one positioning face is arranged on an outer surface of the positioning body, so that a simple interaction with the positioning face is thus possible.

It is particularly favourable in this case if the positioning body is configured as a closed body, preferably as a solid body.

In association with the previous explanations of the individual embodiments it has been assumed that at least one positioning body is arranged on the ball neck section.

However, an improved positioning or a more stable positioning of the load carrier holding arrangement is possible by arranging a respective positioning body on the ball neck section on opposite sides thereof so that the support of the load carrier holding arrangement can occur by means of two positioning bodies.

For example, it would be conceivable to arrange the positioning bodies on opposite sides in a longitudinal centre plane of the ball neck.

However, alternatively, it is also conceivable to arrange the positioning bodies on the ball neck on opposite sides of a transverse plane of the ball neck running transversely, in particular perpendicularly, to the longitudinal centre plane.

It is favourable in particular if the positioning bodies are arranged in a working position of the ball neck on opposite sides of a longitudinal centre plane of the trailer coupling, wherein in the working position of the ball neck the longitudinal centre plane of the trailer coupling also coincides with a longitudinal centre plane of the motor vehicle body and in particular the longitudinal centre plane of the ball neck.

In this case, the positioning bodies would additionally also be arranged on the ball neck in a staggered arrangement in a direction parallel to the longitudinal centre plane.

Thus a particularly favourable solution provides that the positioning bodies lie in the same transverse plane, which runs transversely, in particular perpendicularly, to the longitudinal centre plane and in particular approximately parallel to the centre axis of the coupling ball.

A particularly favourable solution is that in which the positioning bodies are arranged mirror-symmetrically to the longitudinal centre plane of the ball neck and are thus arranged on both sides of the longitudinal centre plane in exactly the same relative position to the coupling ball, since the coupling ball is in any case formed mirror-symmetrically to the longitudinal centre plane.

No further details have been given with respect to the function of the positioning bodies in association with the previous description of the individual exemplary embodiments.

However, another advantageous solution provides that the at least one positioning body serves not only for the defined alignment of the load carrier holding arrangement relative to the ball neck and to the coupling ball, but at the same time also bears the load, so that in this case the coupling ball does not contribute to supporting the load carrier holding arrangement, but in cooperation with the load carrier holding arrangement only contributes to holding the load carrier holding arrangement in defined alignment to the ball neck.

No further details have likewise been given thus far with respect to the arrangement or the course of the at least one positioning face.

Thus, the positioning faces could have a different symmetry or no symmetry relative to the longitudinal centre plane, for example.

However, a particularly expedient solution provides that the at least one positioning face of the positioning bodies is configured mirror-symmetrically to the longitudinal centre plane of the ball neck, so that the positioning faces themselves also have mirror symmetry to the longitudinal centre plane.

No further details have been given thus far with respect to the configuration and shape of the at least one positioning body itself.

Thus a particularly favourable solution provides that starting from a ball neck section carrying the at least one positioning body this extends away from the ball neck section in a direction of extent.

This is a simple and expedient configuration of the positioning body, which simplifies a support of the load carrier holding arrangement thereon.

For example, it would be possible in this context to configure the positioning body so that this extends in the manner of a branching of the ball neck or in the manner of a shaping of the ball neck.

A particularly simple configuration provides that the direction of extent of the positioning body extends transversely to the ball neck section carrying this.

In addition, no details have likewise been given as yet concerning the course of the positioning face relative to the direction of extent in the case of such a positioning body.

Thus, an advantageous solution provides that the at least one positioning face runs parallel to the direction of extent or at an angle of less than 20° to the direction of extent of the positioning body.

For example, it is provided in this case that the at least one positioning face is a surface region of a geometric surface, which intersects the ball neck section carrying the positioning body, i.e. extends transversely to this ball neck section.

A wide variety of possibilities are conceivable with respect to the arrangement of the positioning faces on the positioning body.

For example, it is provided in this case that the at least one positioning body has positioning faces arranged on opposite sides.

In particular, the positioning faces arranged on opposite sides of the positioning body are configured in this case so that they lie on opposite sides of a transverse plane running transversely, in particular perpendicularly, to the longitudinal centre plane.

The positioning faces are preferably also configured so that they run mirror-symmetrically to the transverse plane.

In association with the function of the positioning faces guide face regions that are to run parallel to the attachment direction were described in an aforementioned exemplary embodiment.

Alternatively or additionally thereto, however, it is also conceivable that the at least one positioning face has at least one positioning face region that runs transversely to the attachment direction.

Moreover, in the case of such positioning face regions extending transversely to the attachment direction there is the possibility of arranging two positioning face regions running transversely to the attachment direction so that with increasing extent in the attachment direction these run at increasing spacing or at decreasing spacing relative to one another, i.e. that together the positioning face regions can create a wedge-like effect in order to obtain an exact positioning thereon.

In this case, the two positioning face regions can run conically or parabolically or hyperbolically or in the form of a cylinder or spherical surface regions relative to one another.

It is additionally expedient if such positioning face regions run symmetrically to the attachment direction so that an exact positioning symmetrical to the attachment direction can be achieved.

Alternatively to configuring the positioning body in such a manner that this extends in an direction of extent, it is provided that the positioning body is formed by a supporting body sitting on the ball neck section carrying the positioning body, wherein such a supporting body is formed by a material layer arranged on the ball neck section.

For example, in a special case it is conceivable to configure the positioning body by a collar formed on the ball neck section carrying this.

In this case, it is preferably provided that the at least one positioning face lies on an outer surface of the positioning body facing away from the ball neck section.

For example, it is provided in this case that the at least one positioning face is arranged to one side of the longitudinal centre plane of the ball neck.

For example, it is provided in this case that the at least one positioning face has a course deviating from a rotationally symmetrical course to the centre axis of the coupling ball.

This is achievable in a particularly simple manner if the at least one positioning face comprises a flattened section of the positioning body.

This can be achieved in particular by the at least one positioning face lying in a geometric surface that does not intersect the ball neck section carrying the positioning body.

A particularly favourable configuration provides that two positioning bodies are provided on the ball neck and that the at least one positioning face of the one positioning body has a surface section that lies in a geometric plane, which forms an angle of less than 120° with the geometric plane, in which a surface section of the at least one positioning face of the other positioning body lies.

The angle preferably amounts to less than 100°, even better less than 90°.

No further details have yet been given with respect to the positioning faces themselves.

In particular, if the positioning body is moulded onto the ball neck in one piece, it is advantageous if the positioning faces are machined faces to be able to exactly fix their position and alignment relative to the coupling ball.

In addition, the aforementioned object is also achieved according to the invention by a load carrier arrangement for a trailer coupling having a ball neck and a coupling ball, in particular for a trailer coupling in keeping with one or more of the above-described features, in that the load carrier arrangement comprises a housing body with a ball seat for the coupling ball of the ball neck of the trailer coupling and that the load carrier holding arrangement comprises at least one positioning retaining element, which is fixedly connected to the housing body and which co-operates with the positioning body arranged on the ball neck.

Thus the advantage of the solution according to the invention is, in contrast to the known load carrier holding arrangements, in which the housing body is fixed to the coupling ball itself, e.g. by a clamping device, it is possible, as a result of the interaction of the at least one positioning retaining element with the positioning body, to achieve a better and more precise alignment of the load carrier holding arrangement relative to the ball neck and to the coupling ball, wherein in particular the positioning retaining element and the positioning body achieve a defined and additional support of the load carrier holding arrangement on the ball neck with the coupling ball.

In this case, the advantage of the solution according to the invention is additionally that it is thus possible to connect the load carrier holding arrangement to the ball neck carrying the coupling ball both simply and also in as stable a manner as possible and create a stable and secure connection between these.

In particular, the interaction between the positioning retaining element and the positioning body occurs with the formation of an interlocking arrangement.

In this case, it is provided in particular that the positioning retaining element co-operates with the positioning body, in particular with the formation of an interlocking arrangement, in such a manner that the housing body is fixed against tilting movements around tilt axes running transversely, in particular perpendicularly, to the centre axis of the coupling ball relative to the ball neck.

As a result, all tilting movements of the housing body can be eliminated by the positioning retaining element and the positioning body.

Alternatively or additionally thereto, it is provided that the positioning body and the positioning retaining element co-operate, in particular with the formation of an interlocking arrangement, in such a manner that the housing body is rotationally fixed against a rotational movement around a rotational axis parallel to the centre axis of the coupling ball or forming an angle of 20° at maximum with the centre axis of the coupling ball.

There is thus also the possibility as a result of the interaction of the positioning body with the positioning retaining element of fixing the housing body in a simple manner against rotational movements around the rotational axis on the ball neck.

It is particularly favourable in this case if the positioning retaining element co-operates with the positioning body without clamping, i.e. that the interaction is not achieved by means of a clamping connection, but that the tilting movements around the tilt axes and/or the rotational movements around the possible rotational axes are eliminated merely by means of an interaction by interlocking without any clamping being necessary between the positioning retaining element and the positioning body.

In this case, the positioning retaining element is configured in particular so that this has at least one seat face, which co-operates with the at least one positioning face of the at least one positioning body in a load carrier holding position.

The interlocking fixture against movements around the tilt axis and/or rotations around the rotational axis can be eliminated as a result of this abutment of the seat face against the positioning face.

In this case, an advantageous solution provides that two positioning retaining elements are fixedly connected to the housing body.

It is preferably provided in this case that the two positioning retaining elements are arranged to be fixed relative to one another.

In addition, it is preferably provided that the two positioning retaining elements are arranged to be fixed relative to the housing body.

It is particularly favourable if the positioning retaining element has two seat faces facing towards one another.

It would be conceivable, in principle, to configure the positioning bodies so that they hold the load carrier holding arrangement relative to the ball neck in a precisely aligned position, but do not support it, so that the load carrier holding arrangement rests on the coupling ball, for example, and is supported by the coupling ball, and to restrict the positioning bodies to a precise alignment of the load carrier holding arrangement by degrees of freedom that are not defined by support of the load carrier holding arrangement by the coupling ball, of the movement of the load carrier holding arrangement relative to the coupling ball and to the ball neck.

The interaction of the positioning body with the positioning retaining element has not been specified in more detail in association with the previous solutions.

It is preferably provided that the respective positioning body with its region bearing the positioning face is arranged in a load carrier holding position between the seat faces of the positioning retaining element.

It is particularly advantageous if the positioning retaining element has seat faces, which extend facing one another and between which the positioning body is arranged in the load carrier holding position.

In addition, it is preferably provided that the positioning retaining element has two guide face regions, which face towards one another and run approximately parallel to the attachment direction.

Such guide face regions allow a fixture against rotation of the load carrier holding arrangement on the ball neck by means of the positioning body and the positioning retaining element.

In this case, it is provided, for example, that the alignment face, in particular the guide face regions, in the load carrier holding position guide the respective positioning body with a small clearance.

To be able to also support the positioning retaining element on the positioning bodies, it is preferably provided that at least one of the seat faces has a support face region running transversely to the attachment direction.

Such a support face region provides the possibility of also transferring the load from the load carrier holding arrangement to the ball neck via the positioning body.

It is particularly favourable if each of the seat faces has a support face region running transversely to the attachment direction.

In particular, it is favourable if the support face regions run at increasing spacing from one another with increasing extent in the attachment direction, so that the support face regions can be used not only to support the load carrier holding arrangement on the positioning body, but also to precisely align this relative to the positioning body.

In this case, the support face regions can run conically or parabolically or in a cylindrical shape or tapered shape to one another.

An advantageous solution provides that the support face regions run in an arc shape relative to one another, e.g. in the form of parabolic arcs or circular arcs or hyperbolic arcs.

A particularly favourable solution provides that in the load carrier position the support face regions fix the stabilising element relative to the positioning body with low backlash.

No further details have yet been given with respect to the arrangement of the stabilising element and the positioning retaining element.

Thus a structurally favourable solution provides that the at least one positioning retaining element lies on one side of the ball neck when the load carrier holding arrangement is arranged in the load carrier holding position on the ball neck.

Another expedient solution, in particular a solution in which the positioning faces substantially have guide face regions, provides that the two positioning bodies lie with their positioning faces between the seat faces of two positioning retaining elements.

Thus, with this solution there is the possibility of causing the seat faces to co-operate with the positioning faces by moving the load carrier holding arrangement in the attachment direction and attaching this to the ball neck with the coupling ball, by simply attaching the housing body with the positioning retaining elements to the coupling ball and the ball neck with the positioning body in the attachment direction without further movements of the load carrier holding arrangement being necessary for this.

This solution is also particularly favourable when the two positioning faces of the two positioning bodies and/or the two seat faces of the two retaining bodies have face sections, in particular wedge face sections, which in a wedging direction running transversely to the attachment direction widen or narrow with increasing extent in the wedging direction.

It is thus possible to bring the positioning retaining elements into abutment against one another relative to the positioning bodies by a movement transversely to the attachment direction in the wedging direction and to wedge against one another in order to thus obtain a low-play positioning of the positioning retaining elements relative to the positioning bodies on the ball neck and thus also be able to position the housing body with low play or substantially without play overall relative to the ball neck with the positioning bodies.

In association with the previous description of the load carrier holding arrangement it has merely been discussed how the load carrier holding arrangement can be positioned relative to the ball neck.

However, no explanations have been given regarding the fixture of the load carrier holding arrangement on the ball neck.

Thus an advantageous solution provides that the load carrier holding arrangement has a fixing device that fixes the housing body on the ball neck.

Such a fixing device preferably has a fixing element, which fixes the housing body relative to the ball neck in the load carrier holding position.

In this case, the fixing element can be effective in various ways.

An expedient solution provides that the fixing element co-operates with the coupling ball or the ball neck in such a manner that the housing body is subjected to an attachment force relative to the coupling ball or to the ball neck in the attachment direction and therefore does not move away from the ball neck in contrary direction to the attachment direction.

In particular, the attachment force is always effective in this case so long as the load carrier holding arrangement is in the load carrier holding position and the fixing element is in the fixing position.

A further advantageous solution provides that the fixing element co-operates with the coupling ball or the ball neck in such a manner that the housing body experiences a clamping force acting transversely to the attachment direction relative to the coupling ball or to the ball neck and reduces or removes a clearance between the coupling ball seat and the coupling ball and/or between the positioning body and the positioning retaining element.

In particular, the clamping force is constantly effective in this case so long as the load carrier holding arrangement is in the load carrier holding position and the fixing element is in the fixing position.

The generation of the attachment direction and/or the clamping force occurs in particular by an interaction of the fixing element with a surface on the coupling ball or the ball neck that runs inclined or curved relative to the attachment direction, wherein the surface can be arranged directly on the ball neck or on a body sitting on the ball neck, e.g. the positioning body.

In this case, a first advantageous solution provides that the fixing element engages on the positioning body in a fixing position and the fixture of the load carrier holding arrangement to the ball neck thus is also achieved by means of the positioning body.

In particular, this can be achieved by the fixing element engaging behind the at least one positioning body on a front side in the attachment direction and thus being able to act on the load carrier holding arrangement in the direction of the attachment direction.

In the simplest case the fixing element is configured as a hook engaging behind the at least one positioning body.

To be able to release the fixing element from the positioning body, on the one hand, while also being able to exert the force acting in the attachment direction on the load carrier holding arrangement, on the other hand, it is preferably provided that the fixing element is held on the housing body to be movable between a release position and a fixing position.

This can also be achieved by different measures.

An advantageous solution provides that the fixing element is coupled to a toggle joint arrangement, which provides the possibility of acting on the positioning body with the fixing element in the fixing direction or also releasing the fixing element from the positioning body in the release position.

In particular, such a toggle joint arrangement can be advantageously used when in the fixing position the toggle joint arrangement is in a top dead centre position, and in this case the fixing element is in its fixing position and engages behind the positioning body.

However, it is also conceivable that the fixing element engages on the ball neck with the coupling ball at another location, e.g. at a lug or recess provided specifically for this.

An advantageous solution provides that the fixing element engages on the ball neck or on the coupling ball in a fixing position.

This is achievable in particular in that the fixing element engages behind an undercut on the ball neck or engages into a recess on the ball neck or engages behind the coupling ball on a front side in attachment direction, i.e. in the case of a vertical attachment direction from the top downwards on a lower side.

Such an engagement on the ball neck or on the coupling ball in the fixing position can be achieved in particular in that in the fixing position the fixing element projects into a ball seat of the housing body.

To be able to move the fixing element between a fixing position and a release position, it is preferably provided that the fixing element is movably guided in a guide channel between the fixing position and the release position.

In a particularly simple solution the guide channel is configured as a guide bore of the housing body.

In this case, the guide channel preferably runs transversely to the ball seat of the housing body so that the fixing element can project into the ball seat of the housing body in the fixing position in a simple manner or can be positioned set back therefrom in the release position.

To hold the fixing element in its fixing position, an operating device is preferably provided, by means of which the fixing element can be acted on in the fixing position.

In this case, the operating device preferably comprises a wedge gear that acts on the fixing element.

A particularly favourable solution provides that the operating device comprises a spring-loaded wedge gear, with which the fixing element can be acted on in the fixing position.

For example, a configuration of such a spring-loaded wedge gear provides that this has a wedge body with a wedge face acting on the fixing element and a resilient element acting on the wedge body.

However, the spring-loaded wedge gear is preferably also configured in such a manner that this is also spring-loaded in the release position so that the movement of the wedge body from the fixing position into the release position must occur against the force of the resilient element of the wedge gear.

In this case, the wedge body is preferably guided in a wedge body guide.

The wedge body guide could be arranged on the housing body as a separate structural part.

A particularly expedient solution preferred in particular because of its simplicity and robustness provides that the wedge body guide is integrated into the housing body.

To be able to move such a fixing element from the fixing position into the release position, it is preferably provided that the operating device has a release element, which can act on the operating device.

One possibility consists of the release element acting on the fixing element.

However, it is advantageous particularly when using a wedge gear if the release element acts on the wedge gear and moves this into a release position, wherein in particular an action on the wedge body thereof occurs.

The forces to be applied with the release element are therefore lower than if a direct action were to occur on the fixing element.

Therefore, with such a release element the wedge gear is movable from its fixing position into the release position.

In this case, it is preferably provided that in the release position of the wedge gear the fixing element is freely movable between the fixing position and the release position, and thus upon removal of the load carrier holding arrangement from the ball neck and the coupling ball the fixing element can be displaced from the fixing position into the release position by moving the coupling ball out of the ball seat.

To prevent the fixing element from moving into the fixing position before renewed attachment of the load carrier holding arrangement on the ball neck and the coupling ball during release of the fixing device and removal of the load carrier holding arrangement from the ball neck, the operating device preferably has an associated release position lock, which ensures that in the release position with the load carrier holding arrangement removed the operating device remains in the release position.

Such a release position lock can be realised, for example, by a locking slide, which acts on the release element and holds this in the release position.

Alternatively hereto, an advantageous embodiment provides that in the release position of the operating device the release position lock acts on wedge gear to hold this fixed in the release position so that the fixing element can move freely between the fixing position and the release position.

A particularly simple solution provides that the release position lock acts on the wedge body to hold this in the release position.

On the other hand, to also achieve an automatic locking of the load carrier holding arrangement after once again attaching the load carrier holding arrangement to the ball neck with the coupling ball, it is preferably provided that the release position lock is provided with a lock release arrangement, which, when operative, prevents or overrides the locking position of the release position lock when, in the case where the load carrier holding arrangement sits on the ball neck with the coupling ball, the ball neck and the coupling ball are in the ball seat in the load carrier holding position.

For example, a sensing element, which detects the position of the coupling ball in the ball seat by mechanical sensing, is provided for this reason.

However, the sensing element can also be configured so that it detects the position of a section of the ball neck or an element provided on the ball neck.

With respect to the function of the release position lock it has only been discussed so far that this is able to move into the locking position.

However, it is particularly favourable if the release position lock moves automatically into the locking position when the operating device moves into the release position by actuations of the release element and the coupling ball and the ball neck are no longer in the load carrier holding position relative to the ball seat, wherein only when the coupling ball and ball neck are no longer in the load carrier holding position, is the lock release arrangement inoperative and allows movement of the release position lock into the locking position.

This has the advantage that no action whatsoever on the release position lock is necessary, but this always moves independently into the locking position when this is permitted by the lock release arrangement.

For example, the load carrier holding arrangement can thus be lifted simply from the ball neck with the coupling ball merely by an action on the release element being performed to move the operating device into the release position so that the release position lock then automatically becomes operative when the load carrier holding arrangement has left the load carrier holding position.

To simplify the lifting of the load carrier holding arrangement according to the invention from the ball neck, it is preferably provided that the release element of the operating device is arranged on the load carrier holding arrangement in such a manner that a force acting to transfer the release element into its release position acts on the load carrier holding arrangement in a contrary direction to the attachment direction.

This means that the action of force that is applied to the release element to move this in the release position can also be used at the same time to lift the load carrier holding arrangement from the ball neck with the coupling ball and thus release it from the ball neck with the coupling ball.

A simplified actuation of the load carrier holding arrangement during lifting is possible as a result of this.

Further features and advantages of the invention are the subject of the following description as well as the representation of some exemplary embodiments in the drawing.

BRIEF DESCRIPTION OF THE DRAWINGS

FIG. 18 shows a section similar to FIG. 10 through a sixth exemplary embodiment of a load carrier holding arrangement according to the invention;

FIG. 19 shows a section taken along line 19-19 in FIG. 18;

FIG. 20 shows a section similar to FIG. 10 through a seventh exemplary embodiment of a load carrier holding arrangement according to the invention.

DETAILED DESCRIPTION OF THE INVENTION

Figure 1:
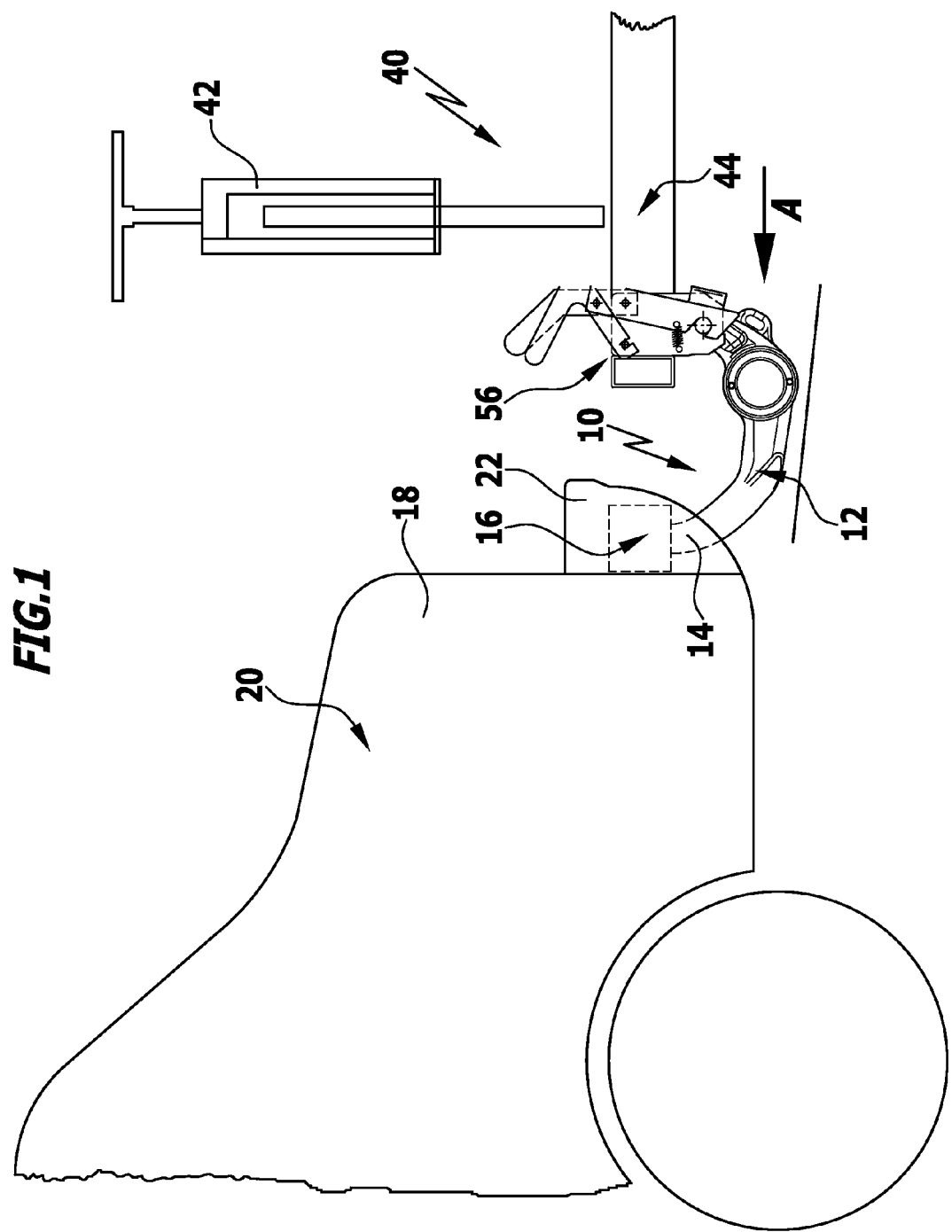
FIG. 1 is a side view of a motor vehicle, in particular an automobile, with a trailer coupling standing in the working position and a load carrier holding arrangement held on the trailer coupling.
Figure 2:
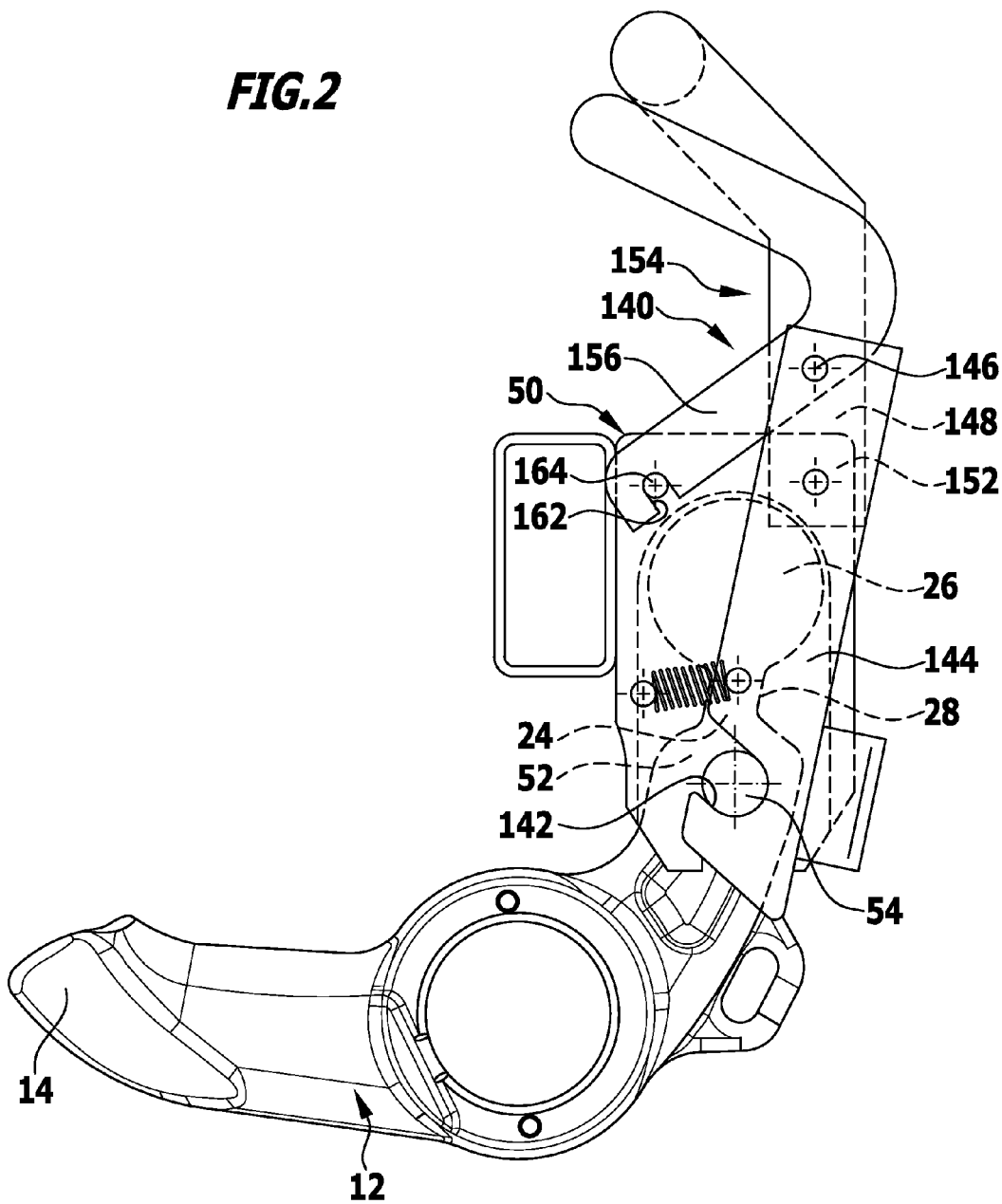
FIG. 2 is a view similar to FIG. 1 showing on an enlarged scale a part of a ball neck of the trailer coupling and a load carrier holding arrangement fixed on the trailer coupling in the fixing position.

An exemplary embodiment represented in FIGS. 1 and 2 of a trailer coupling given the overall reference 10 comprises a ball neck 12, which is connected at a first end 14 to a ball neck support 16, which is itself fixedly held on a rear part 18 of a motor vehicle body given the overall reference 20 of a motor vehicle, wherein the ball neck support 16 is fixedly connected to the rear part 18 preferably concealed by a rear bumper unit 22.

The ball neck support 16 can comprise, for example, a standard cross member, which extends below the bumper unit 22 and parallel thereto and also transversely to a longitudinal direction of the motor vehicle body 20 and which is itself connected to the rear part 18, and moreover either a seating, at which the ball neck 12 is fixedly or releasably held at the end 14, or a pivotal bearing, with which the ball neck 12 can be pivoted around one or more axes relative to the rear part 18 between a working position shown in FIGS. 1 and 2 and a resting position (not shown), wherein in the resting position the ball neck 12 extends approximately parallel to the bumper unit 22 and is arranged to be substantially concealed by the rear bumper unit 22.

As shown in FIG. 2, the ball neck 12 is bent at its second end 24 opposite the first end 14, so that in the working position the end 24 extends away from a road surface, and carries a coupling ball given the overall reference 26, wherein between the coupling ball 26 and the end 24 a throat referenced as ball attachment piece 28 is provided, which connects to the end 24 in continuation of a course of the ball neck and by means of which the coupling ball 26 is connected to the second end 24 of the ball neck 12.

In this case, the coupling ball 26 usually serves to hitch a trailer, wherein a trailer has a tow ball coupling, which can be connected to the ball neck 12 to engage over the coupling ball 24.

Figure 3:
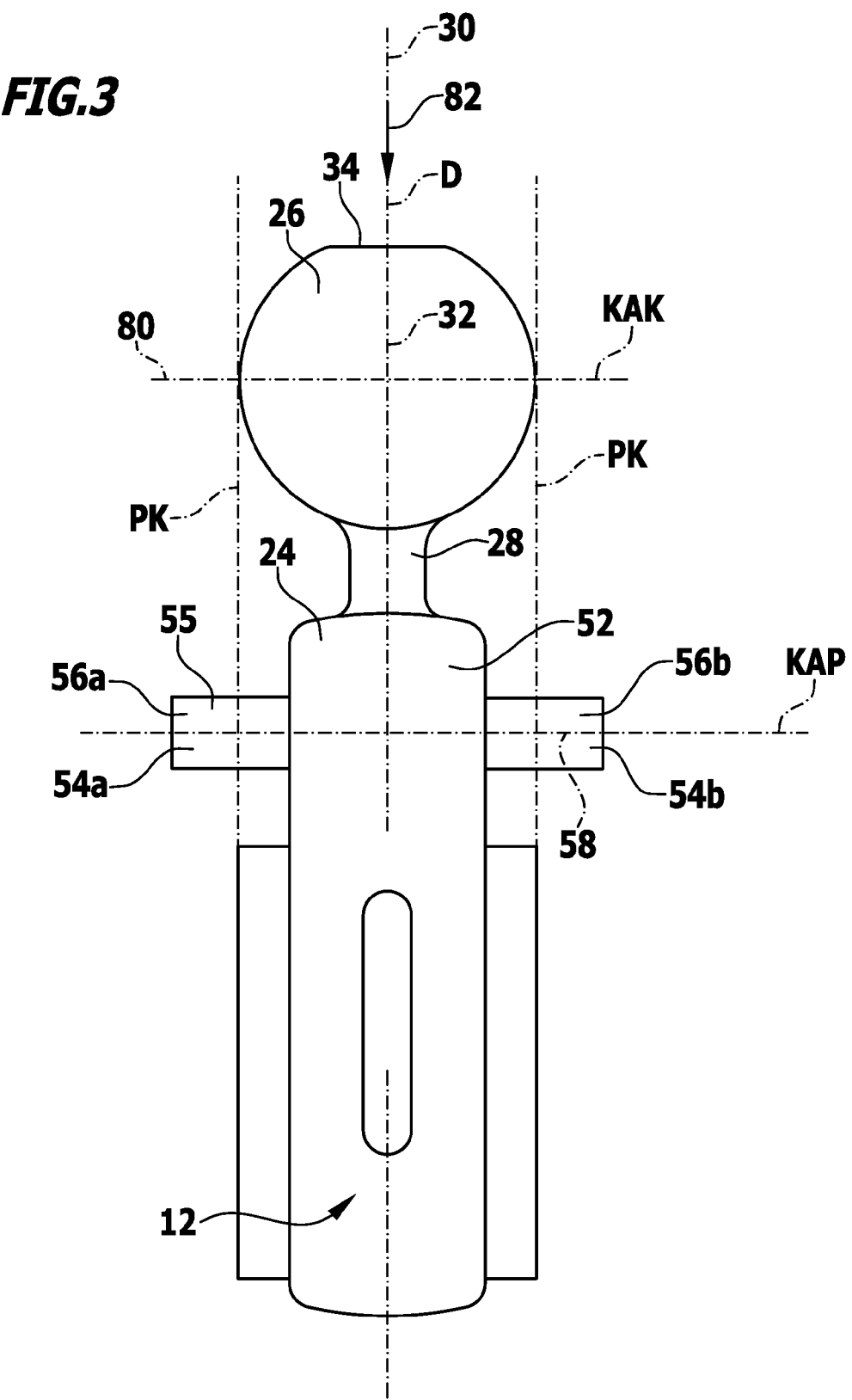
FIG. 3 is a plan view in the direction of an arrow A in FIG. 1 onto the ball neck without a load carrier holding arrangement attached to the ball neck.

In its working position shown in FIGS. 1, 2 and 3, the ball neck 12 is configured symmetrically to a longitudinal centre plane 30 in the same manner as the coupling ball 26, wherein the longitudinal centre plane 30 is not only the longitudinal centre plane 30 of the ball neck 12 and the trailer coupling 10, but in the working position of the trailer coupling also coincides with the vertical longitudinal centre plane 30 of the rear part 18 and the motor vehicle body 20.

In this case, in particular a centre axis 32 of the coupling ball 26 lies in the longitudinal centre plane 30, wherein the centre axis 32 of the coupling ball 26 is defined in that it simultaneously represents a centre axis 32 of the ball attachment piece 28 and/or is additionally defined in that it runs centrally and perpendicularly to a flattened section 34 of the coupling ball 26, which is provided on the coupling ball 26 on a side opposite the ball attachment piece 28, so that the shape of the coupling ball 26 in the region of the ball attachment piece 28, on the one hand, and in the region of the flattened section 34, on the other hand, deviates from a complete spherical surface 38 running around a ball centrepoint 36 on the centre axis 32.

As shown in FIGS. 1 and 2, the trailer coupling 10 can serve not only to connect a trailer to the motor vehicle body 20, but also to fix a load carrier given the overall reference 40 to the motor vehicle body 20.

In this case, the load carrier 40 serves to transport bicycles 42, for example, but it is also conceivable to transport other loads of any type with the load carrier 42.

The load carrier 40 comprises a load carrier base 44, e.g. configured in the form of a base frame to receive the different loads, which is provided with a load carrier holding arrangement 50, with which the load carrier 40 can be fixed to the ball neck 12.

Figure 4:
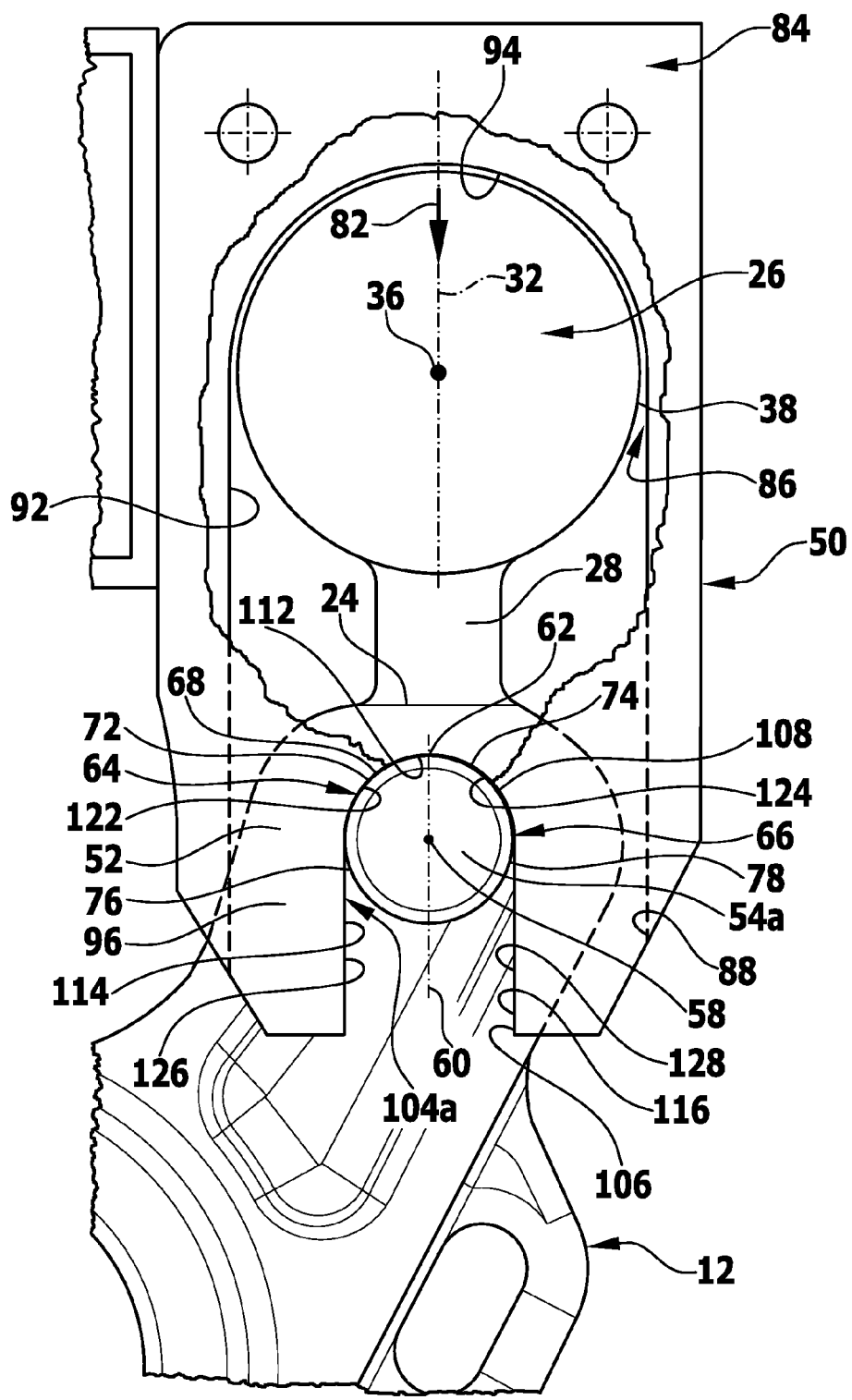
FIG. 4 is a partially broken open representation of the load carrier holding arrangement attached to the ball neck of the trailer coupling.

As shown in FIGS. 2 to 4, in a ball neck section 52 directly adjoining the end 24 and the ball attachment piece 28 the ball neck 12 is provided with positioning bodies 54a and 54b, which project laterally beyond said ball neck section and which are formed, for example, by solid lugs 56a, 56b, in particular with a cylindrical shell surface, moulded onto the ball neck section 52 and projecting laterally beyond the ball neck 52.

In this case, the solid lugs 56a and 56b are arranged symmetrically to the longitudinal centre plane 30 and also extend symmetrically to the longitudinal centre axis 30 from the ball neck section.

However, alternatively to moulding the positioning bodies 54 onto the ball neck section 52 it is also possible to form the positioning bodies 54 by means of a pin, e.g. with a cylindrical shell surface, which passes through a ball neck section 52 in a bore and which then forms the lugs 56a, b at its two ends.

The positioning bodies 54, in particular the lugs 56, are preferably configured so that the shape of the positioning bodies 54a and 54b is respectively mirror-symmetrical to the longitudinal centre plane 30.

As shown in FIGS. 3 and 4 in particular, the positioning bodies 54a and 54b extend in their longitudinal axis 58 in a direction of extent 59, which runs transversely, preferably perpendicularly, to the longitudinal centre plane 30.

The longitudinal axis 58 lies in a transverse plane 60, for example, which extends transversely, preferably perpendicularly, to the longitudinal centre plane 30 and which additionally runs parallel to the centre axis 32 of the coupling ball 26, in particular runs through the centre axis 32 of the coupling ball 26.

The positioning bodies 54 comprise positioning faces 64, 66, which lie on both sides on an outer surface 55 thereof and run parallel to the longitudinal axis 58 and to the direction of extent 59.

In particular, the positioning faces 64, 66 extend from a crest 62 lying on the outer surface and facing the coupling ball 26.

In this case, the vertical line 62 lies in particular in the transverse plane 60, which runs through the coupling ball 26, on the one hand, and intersects the positioning bodies 54a and 54b, on the other hand, in particular centrally as shown in FIGS. 3 and 4.

Lying on opposite sides of the transverse plane 60 are the positioning faces 64 and 66 of the positioning bodies 54a and 54b, which preferably extend parallel or at an angle of up to 20° to the longitudinal axis 58 of the positioning bodies 54a, 54b, wherein the positioning faces 64 and 66 are part-surfaces of a geometric outer shell surface of the positioning bodies 54a and 54b, which is given the overall reference 68 and intersects the ball neck section 52.

In the case of the configuration of the positioning bodies 54a and 54b in the form of cylindrical pins, the outer shell surface 69 of the positioning bodies 54a and 54b represents a cylinder shell surface, wherein the longitudinal axis 58 forms a cylinder axis to this cylinder shell surface.

In this case, the positioning faces 64 and 66 preferably extend on both sides at increasing spacing from the transverse plane 60, wherein the positioning faces 62 and 64 have positioning face regions 72 and 74, which firstly run transversely to the transverse plane 60 and also transversely to the longitudinal centre plane 30, and with increasing spacing from the coupling ball 26 also run with increasing spacing from the transverse plane 60 and which merge into guide face regions 76, 78 of the positioning faces 64 and 66 that run approximately parallel or parallel to the transverse plane 60.

In this case, the positioning face regions 72 and 74 merge, for example, steplessly into the guide face regions 76 and 78 respectively.

In the exemplary embodiment of the ball neck 12 according to the invention shown in FIGS. 2 to 4, the positioning bodies 54a and 54b lie so close to the ball attachment piece 28 that a distance of the vertical line 62 of the positioning bodies 54a, b from the end 24 of the ball neck 12, at which the ball attachment piece 28 begins, is smaller than 1.5-times the extent of the ball attachment piece 28 between the second end 24 and the coupling ball 26.

Moreover, the spacing of the positioning bodies 54a and 54b from an equatorial plane 80 of the coupling ball 26 running through the ball centrepoint 36 and perpendicularly to the centre axis 32 in particular is smaller than 1.5-times the diameter of the ball surface 38 of the coupling ball 26.

In particular, the positioning faces 64, 66 with the positioning face regions 72, 74 and the guide face regions 76, 78 lie outside a projection contour PK, i.e. on a side of the projection contour PK remote from the ball neck section 52, which is formed by projection of the coupling ball onto the positioning body 54, in particular its outer surface.

In this case, the projection occurs parallel to an attachment direction 82, in which the load carrier holding arrangement 50 is attachable to the coupling ball 26 and the ball neck 12.

The attachment direction 82 preferably runs approximately parallel to the centre axis 32.

The load carrier holding arrangement 50 is attachable to the above-described ball neck 12, which at the second end 24 carries the coupling ball 26 and in the ball neck section 52 lying close to the second end carries the positioning bodies 54a and 54b, wherein the attachment of the load carrier holding arrangement 50 occurs in the attachment direction 82, which in particular runs parallel to the longitudinal centre plane 30 and approximately parallel to the centre axis 32.

The approximately parallel course of the attachment direction 82 is to be understood to mean that a maximum angle between the centre axis 32 of the coupling ball 26 and the attachment direction 82 should amount to less than 30°, so that the attachment direction can run parallel and/or at an angle to the centre axis 32 or also on a curve.

The load carrier holding arrangement 50 itself has a housing body 84, in which a ball seat 86 is provided for the coupling ball 26, wherein extending from a seat opening 88 of the housing body 84 the ball seat 86 has a cylindrical ball guide face 92, which extends into the housing body 84 and opposite the seat opening 88 merges into an end face 94 of the ball seat 86, which can be configured as a spherical cap face, for example, wherein in this case the spherical cap face is adapted approximately to the spherical surface 38 of the coupling ball 26.

However, the end face 94 can also be a plane face closing off the ball guide face 92.

Moreover, the housing body 84 is provided with holding elements 96, wherein the holding elements 96 have a respective positioning retaining element 104, which co-operates respectively with one of the positioning bodies 54.

The holding elements 96 in particular create a fixed connection with the housing body 84, so that the positioning retaining elements 104 are arranged fixedly both relative to the housing body 84 and also relative to one another.

The positioning retaining element 104a shown in FIG. 4, which co-operates with the positioning body 54a, extends, for example, from a seat opening 106 as far as a seat base 108 lying opposite the seat opening 106.

The positioning retaining element 104 comprises seat faces 114 and 116, which extend from the seat opening 106 into the seat base 108 and which in the region of the seat base 108 are configured as support face regions 122 and 124, which run towards one another in a contrary direction to the attachment direction 82 and, for example, can merge into one another in the region of a base line 112 of the seat base 108 or terminate at a spacing from one another.

Moreover, adjoining the support face regions 122 and 124 the seat faces 114 and 116 comprise guide face regions 126 and 128, which run as far as the seat opening 106 and in particular run parallel to the attachment direction 82.

In this case, the guide face regions 126 and 128 serve to guide the positioning body 54 entering the positioning retaining elements 104 through the seat opening 106 by these abutting against the guide face regions 76 and 78 of the positioning bodies 54 and thus guiding the load carrier holding arrangement 50 during attachment in the attachment direction 82, whereas the support face regions 122 and 124 of the positioning retaining elements 104 are configured so that these abut against the positioning face regions 72 and 74 of the positioning faces 64 and 66 of the positioning bodies 54 over as extensive a surface as possible.

Thus, in the first variant of the load carrier holding arrangement 50 configured according to the invention the entire load of the load carrier 40 sits on the positioning bodies 54a and 54b, namely in that, on the one hand, the support face regions 122 and 124 of the positioning retaining elements 104 abut against the positioning face regions 72 and 74 of the positioning bodies 54 over as extensive a surface as possible.

Moreover, the effect of the course of the support face regions 122 and 124 widening in the attachment direction 82 and the course of the positioning face regions 71 and 74 widening at least approximately identically in the attachment direction 82 is that the positioning retaining elements 104 experience a precise alignment transversely to the attachment direction 82 relative to the positioning bodies 54.

On the other hand, the guide face regions 126 and 128 of the positioning retaining elements 104 serve to guide the housing body 84 during attachment in the attachment direction 82 on the positioning body 54, in particular guide face regions 76 and 78 thereof, so that the positioning retaining elements 104 with the support face regions 122 and 124 come into abutment against the positioning face regions 72 and 74 of the positioning bodies 54.

During attachment of the housing body 84 onto the ball neck 12 with the coupling ball 26 the coupling ball 26 is firstly inserted through the seat opening 88 into the ball seat 86, wherein the ball guide faces 92 abut against the ball surface 38 of the coupling ball 26 with a clearance and guide the coupling ball 26 when moving into the ball seat 86 in the direction of the end faces 94 until the positioning retaining elements 104 with their seat openings 106 reach the positioning bodies 54 and then the positioning bodies 54 are moved into the positioning retaining elements 104 until the support face regions 122 and 124 of the positioning retaining elements 104 abut against the positioning face regions 72 and 74 of the positioning bodies 54 so that the load carrier holding position is reached.

In the first variant, in this load carrier holding position of the load carrier holding arrangement 50 the coupling ball 26 does not abut against the end face 94 of the ball seat 86, but is located at a short spacing from this, so that the entire load is transferred from the positioning retaining elements 104 to the positioning bodies 54 and from this to the ball neck 12, whereas the coupling ball 26 abuts against the ball guide faces 92 and thus provides an additional support of the housing body 84 relative to the ball neck 12 against tilting of the housing body 84 around the positioning bodies 54, in particular around a tilt axis KAK formed by the longitudinal axes 58 thereof running transversely to the centre axis 32.

Moreover, the described interaction of the positioning bodies 54 with the positioning retaining elements 104 prevents the housing body 84 from rotating around a rotational axis D, which runs approximately parallel to the attachment direction 82.

In this case, an approximately parallel course to the attachment direction 82 is understood to mean a course of the rotational axis D, in which the rotational axis D forms an angle of 30° at maximum with the attachment direction.

However, alternatively, it is also conceivable in a second variant to configure the end face 94 as a conical face or as a spherical cap face and to configure the housing body 84 with the stabilising elements 96 and the positioning retaining elements 104 so that the entire load of the load carrier 40 is transferred from the end face 94 to the coupling ball 26 and the positioning bodies 54 merely serve to support the housing body 84 against tilting on all sides around tilt axes KAK passing through the coupling ball 26 and running transversely to the centre axis 32, wherein in this case the guide face regions 126 and 128 primarily prevent tilting of the housing body 84 around the coupling ball 26 by abutting against the guide face regions 76 and 78 of the positioning bodies 54, on the one hand, and prevent rotation of the housing body 84 around a rotational axis D running approximately parallel to the attachment direction 82, on the other hand, whereas the support face regions 122 and 124 of the seat faces 114 and 116 can lie on the corresponding positioning face regions 72 and 74 of the positioning faces 64 and 66 of the positioning bodies 54, for example, on one side, i.e. on one side of the ball neck 12 or one side of the transverse plane 60, to effect an additional support.

Figure 5:
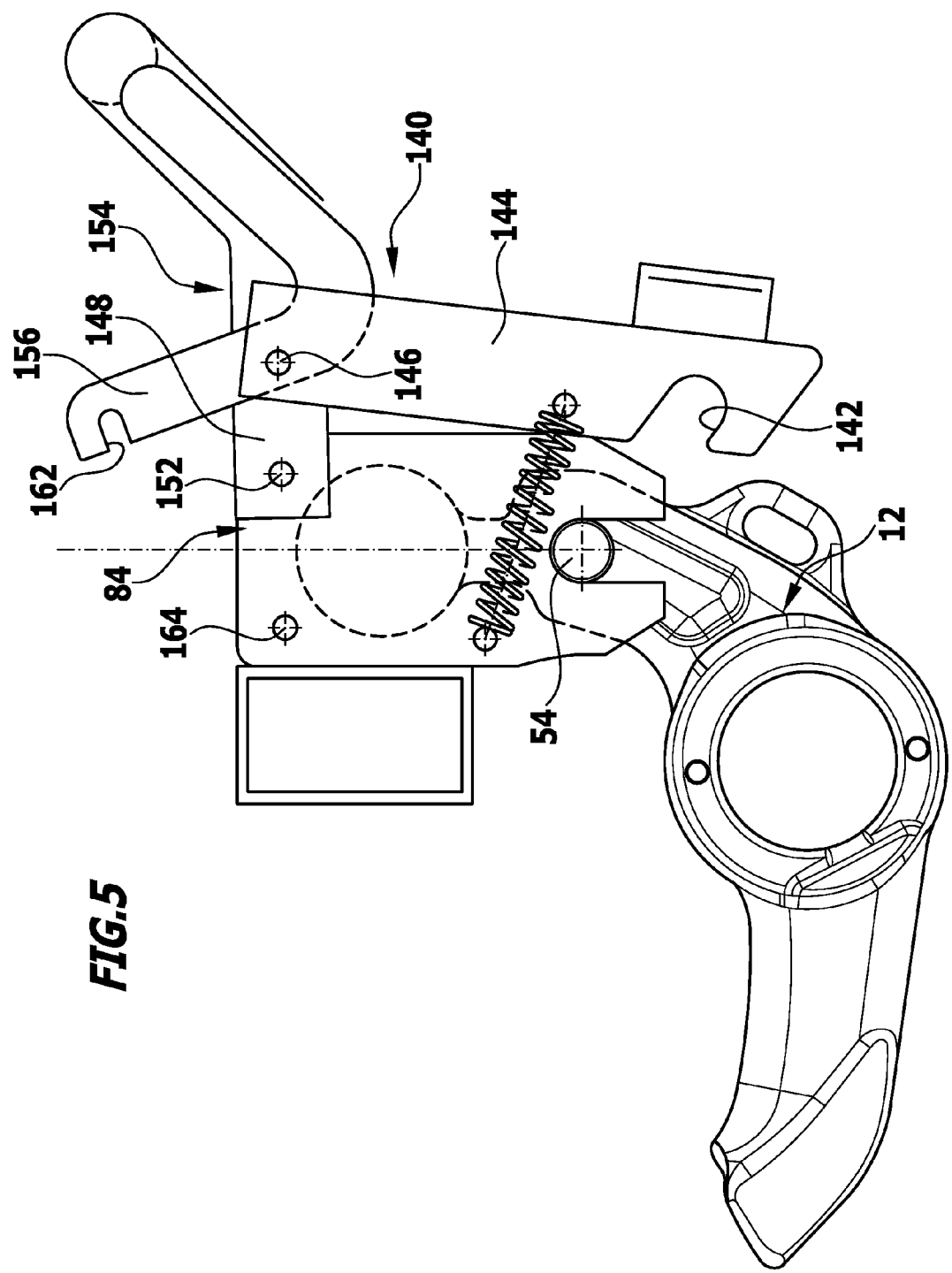
FIG. 5 is a representation similar to FIG. 2 of the load carrier holding arrangement in a release position.

As shown in FIGS. 2 and 5, to fix the housing body 84 in the load carrier holding position on the ball neck 12, a fixing device given the overall reference 140 is provided, which comprises fixing elements 142 configured as hooks, for example, and moulded into fixing arms 144, which are themselves connected by means of a joint 146 to a further arm 148, which in turn is mounted to pivot on the housing body 84 by means of a joint 152.

The fixing arm 144 and the second arm 148 together with the joint 146 form a toggle joint arrangement 154, which, to release the fixing elements from the positioning bodies 54, can be brought into an angled position shown in FIG. 5 so that the fixing elements 142 are released from the positioning bodies 54, whereas the toggle joint arrangement 154 can be brought from the angled, released position shown in FIG. 5 into an extended top dead centre position shown in FIG. 2, in which, on the one hand, the fixing elements 142 engage behind the positioning bodies 54 and as a result of the top dead centre position the toggle joint arrangement 154 acts by means of the joint 152 on the housing body 84 in such a way that this is acted on overall in the attachment direction 82 in the direction of the positioning body 54, so that finally the positioning retaining elements 104 are acted on in the direction of the positioning bodies 54 and in the first variant act on these in order to stably fix the housing body 84 relative to the ball neck 12, so that the load carrier holding arrangement 50 cannot move away from the ball neck 12 in the opposite direction to the attachment direction 82 and can thus release.

To secure the top dead centre position of the toggle joint arrangement 154, a locking lever 156 is additionally mounted to pivot on the arm 148 also by means of the joint 146, wherein the locking lever 156 has a first locking element 162, e.g. in the form of a recess, which can be brought into engagement with a second locking element 164 arranged on the housing body 84 e.g. in the form of a projection, as shown in FIG. 2, in order to fix the toggle joint arrangement 154 in the extended top dead centre position, in which the fixing elements 142 engage behind the positioning bodies 54 in order to fix the load carrier holding arrangement 50 in the load carrier holding position on the ball neck 12.

In a second exemplary embodiment of a load carrier holding arrangement 50 according to the invention shown in FIGS. 6 to 9, the housing body 84' also comprises a ball seat 86 for the coupling ball 26 of the ball neck 12, wherein the ball seat 86 is configured in the same manner as in the first exemplary embodiment.

The stabilising element 96 and the positioning retaining element 104 as well as the positioning plane 54 are also configured in the same way as in the first exemplary embodiment, so that reference can be made in full to the explanations of the first exemplary embodiment with respect to the description thereof.

In particular, as in association with the first exemplary embodiment an attachment of the housing body 84 in the attachment direction 82 also occurs in order, on the one hand, to move the coupling ball 26 through the seat opening 88 into the ball seat 86 and, on the other hand, to be able to bring the positioning retaining element 104 into engagement with the positioning bodies 54, as has been described in detail in association with the first exemplary embodiment.

In contrast to the first exemplary embodiment, however, a fixing device 170 is provided, which is configured in a different manner from the fixing device of the first exemplary embodiment.

The fixing device 170 comprises a fixing element 172, which does not act on the positioning body 54, but acts to fix the load carrier holding arrangement 50 onto the coupling ball 26, i.e. onto a ball surface region 174 of the ball surface 38, which lies between an equatorial plane 176 of the coupling ball, which runs through the ball centrepoint 36 and perpendicularly to the centre axis 32, and between the ball attachment piece 28.

The fixing element 172 configured as a ball, for example, is arranged in a guide bore 178 of the housing body, which runs transversely to the ball seat 86, in particular transversely to the ball guide face 92, so that the fixing element 172 is movable in a transverse direction 182 to the attachment direction 82 and therefore also movable transversely to the ball guide face 92 of the ball seat 86 between a fixing position, in which the fixing element 172 abuts against the coupling ball 26 which is in the load carrier holding position, and a release position, in which the fixing element 172 does not project into the ball seat 86.

The fixing element 172 in the guide bore 178 can thus be moved in the direction of the coupling ball 62 to such an extent that this acts on the ball surface region 174 and can thus act on the coupling ball 26 in this ball surface region 174.

Because of the curvature of the ball surface region 174, which lies between the equatorial plane 176 and the ball seat 28, action on the coupling ball 26 by the fixing element 172 leads to the housing body 84 experiencing an attachment force 184, on the one hand, which acts in the attachment direction 82 and therefore presses the positioning retaining element 104 against the positioning body 54 of the ball neck, wherein in particular the respective seat base 108 is pressed with the support face regions 122 and 124 against the respective positioning face regions 72 and 74 of the positioning body 54.

On the other hand, the action on the coupling ball 26 by the fixing element 172 generates a clamping force 186 acting in the transverse direction, which acts on the housing body 84 and reduces or eliminates play between the ball surface 38 of the coupling ball 26 and the ball guide faces 92.

Figure 6:
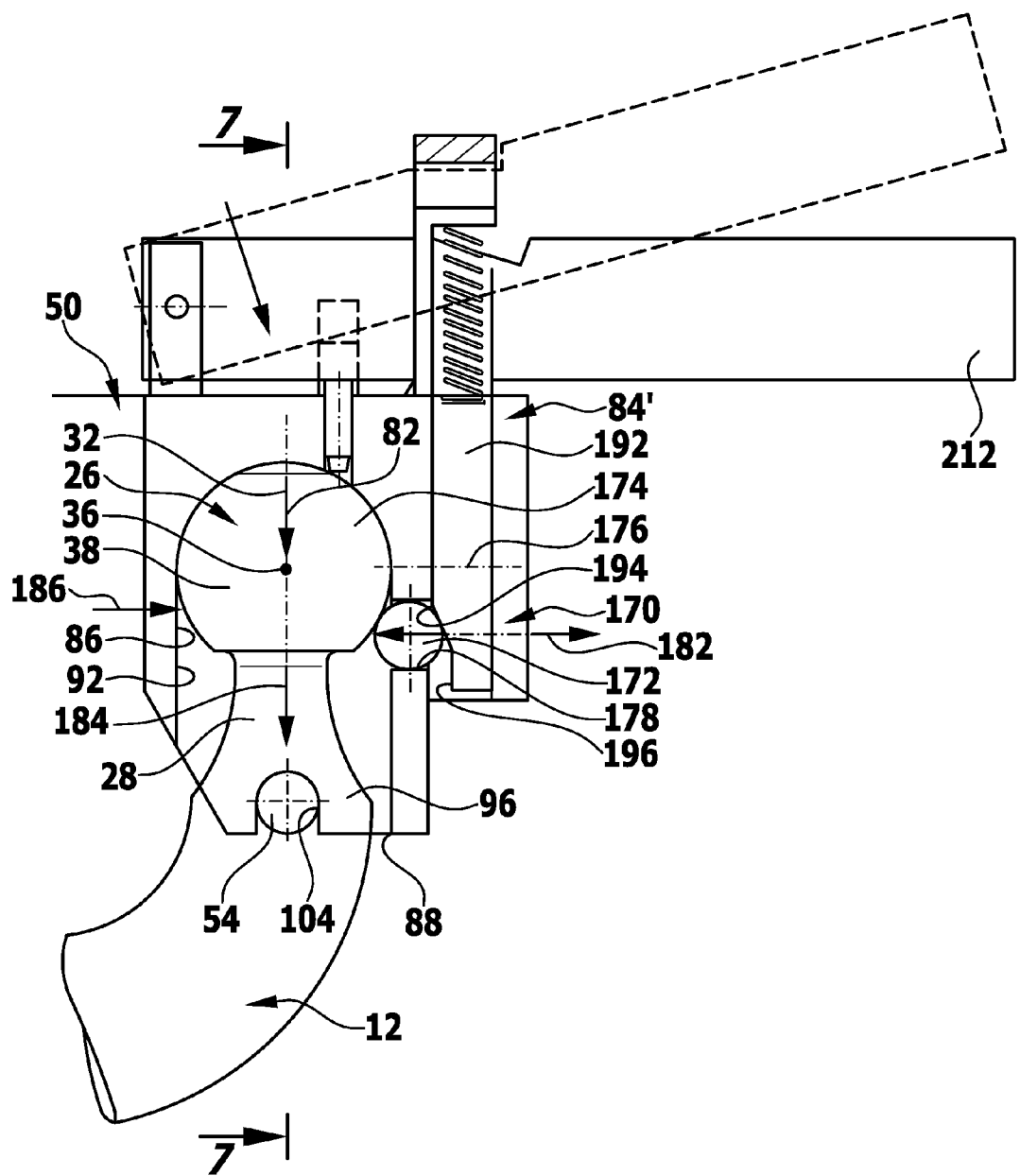
FIG. 6 is a representation similar to FIG. 2 of a second exemplary embodiment of a load carrier holding arrangement according to the invention in a fixing position.
Figure 8:
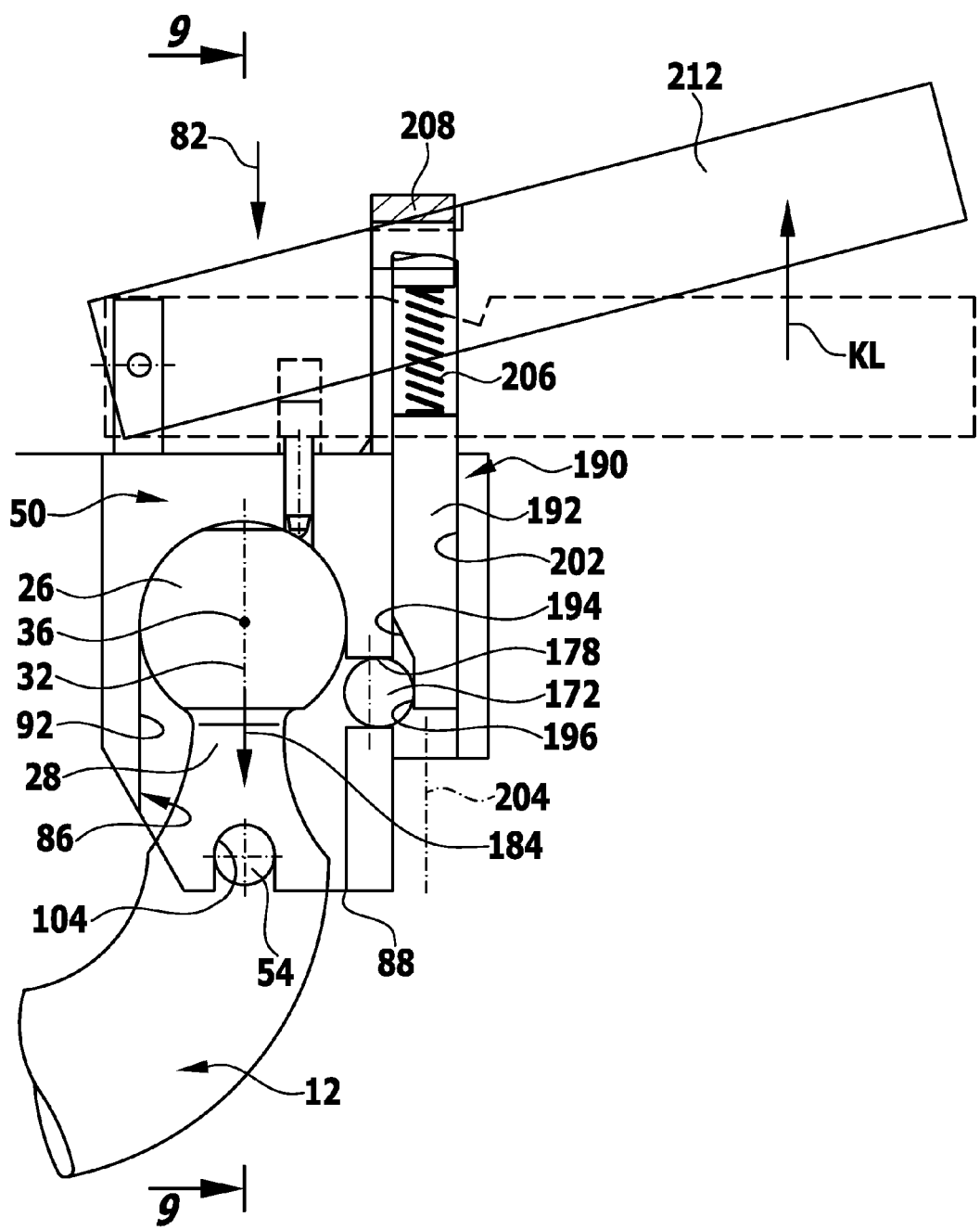
FIG. 8 is a representation of the load carrier holding arrangement according to FIG. 6 in a release position shortly before lifting the load carrier holding arrangement from the ball neck with the coupling ball.

To act on the fixing element 172 an operating device 190 is provided with a wedge body 192, which acts on the fixing element 172 in its fixing position shown in FIG. 6 with a wedge face 194 in the direction of the coupling ball 26, wherein the wedge face 194 terminates in a retraction face 196, which is set back to such an extent that when the wedge body 192 is displaced into a release position shown in FIG. 8, the retraction face 196 allows the fixing element 172 in the guide bore 178 to be able to move so far away from the coupling ball 26 and come into the release position that the coupling ball 26 can be moved along the ball guide face 92 in the direction of the seat opening 88 in the ball seat 86 and can thus be moved out of the ball seat 86 in order to release the load carrier holding arrangement 50 from the ball neck 12 and the coupling ball 26.

The wedge body 192 is itself guided in the wedge body guide 202 of the operating device 190, which is also, for example, a recess provided in the housing body 84, which extends with a longitudinal direction 204, for example, parallel to the ball seat 86, so that the wedge body 192 is also moveable in the longitudinal direction 204 of the wedge body guide 202 between the fixing position and the release position.

In order to constantly act on the wedge body 192 in the direction of the fixing position, a resilient element 206 is provided that constantly acts on the wedge body 192 and thus acts on this in the direction of the fixing position.

In this case, for example, the resilient element 206 is supported on a support bearing 208, which is connected to the housing body 84.

The wedge body 192, the wedge body guide 202 and the resilient element 206 together form a spring-loaded wedge gear 210.

To be able to move the wedge body 192 into the release position, the wedge body 192 is coupled to a release element 212 of the operating device 190, e.g. a release lever, which in a non-actuated position shown in FIG. 6 allows a movement of the wedge body 192 into the fixing position, wherein this occurs because of the action on the wedge body 192 by the resilient element 206.

However, if the release element 212 is actuated, i.e. the release lever is swivelled, for example, as shown in FIG. 8, then this acts on the wedge body 192 against the action of force of the resilient element 206 in order to move the wedge body 192 into the release position and hold it in the release position.

Therefore, in this release position of the wedge body 192 there is a possibility of lifting the load carrier holding arrangement 50 from the ball neck 12 by lifting and moving it in the opposite direction to the attachment direction 82 and thus releasing it.

To prevent the wedge body 192 from moving into the fixing position again while lifting the load carrier holding arrangement 50 and with no further actuation of the release element 212, and prevent the fixing element 172 from thus moving into the ball seat 86, a release position lock given the overall reference 220 is provided, which has a locking slide 222, which in a locking position is itself able with a slide lug 224 to hold the release element 212 in its release position that can be reached by actuation.

For this, the locking slide 222 is guided in a slide guide given the overall reference 226 and is movable transversely to the release element 212 so that when the release element 212 is in the release position the slide lug 224 can slide under the support face 228 of the release element 212 to thus in its locking position prevent a movement of the release element 212 from the release position into the non-actuated position.

In this case, the locking slide 222 is constantly acted on by a resilient element 232, which thus constantly ensures that the locking slide 222 moves under the support face 228 with its slide lug 224 in its locking position when the release element 212 is moved into the release position and the locking slide 222 can move freely.

Moreover, the movement of the locking slide 222 can additionally be controlled by a lock control 230, which comprises a guideway 234, which is provided in the locking slide 222 and co-operates with a track follower 236, wherein the track follower 236 is configured as head of a sensing pin 238 of a sensing device 240 for detecting the load carrier holding position, which with a sensing tip 242 detects the position of the coupling ball 26 in the ball seat 86.

Figure 7:
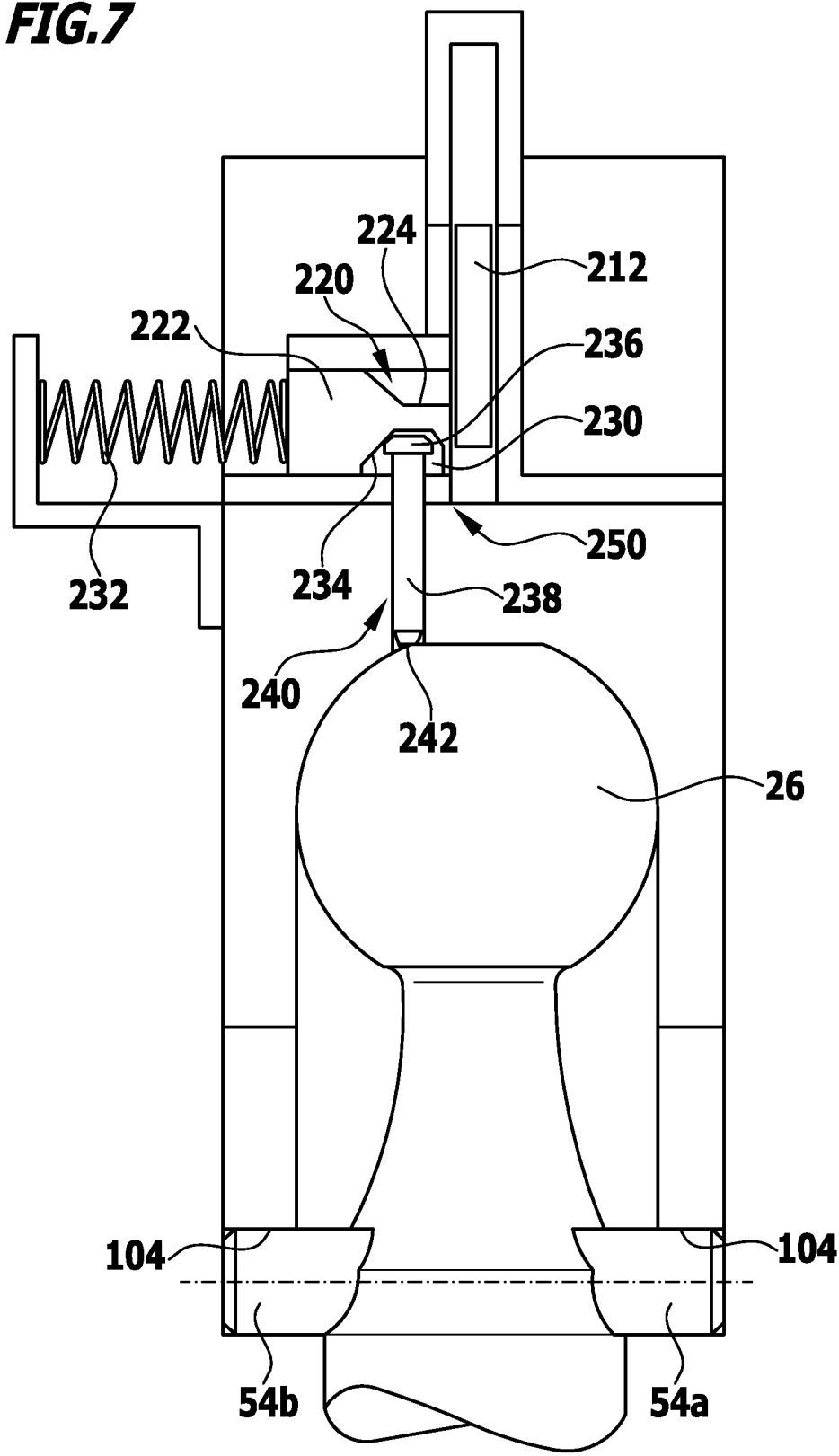
FIG. 7 shows a section taken along line 7-7 in FIG. 6.
Figure 9:
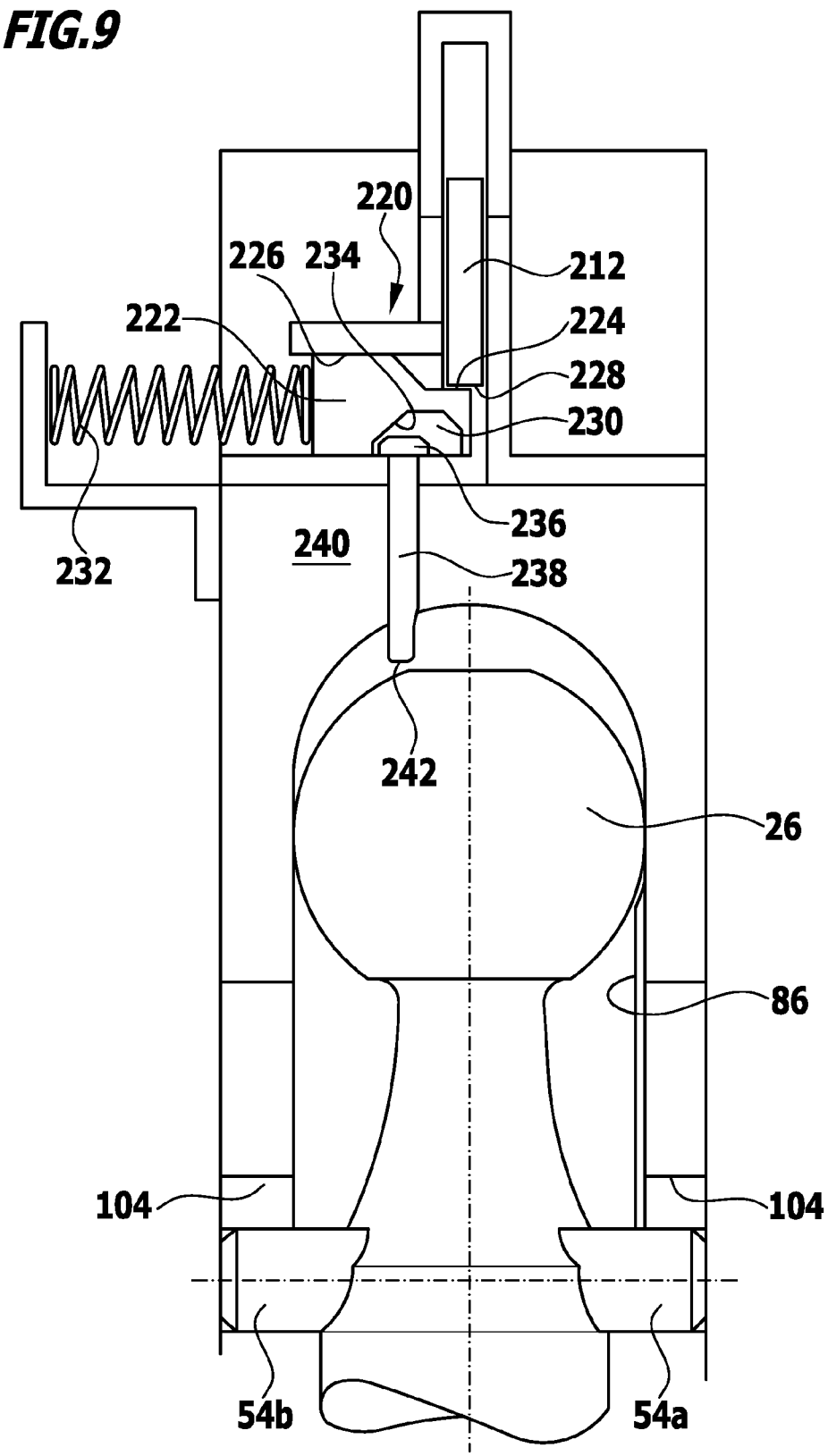
FIG. 9 shows a section taken along line 9-9 in FIG. 8.
Figure 10:
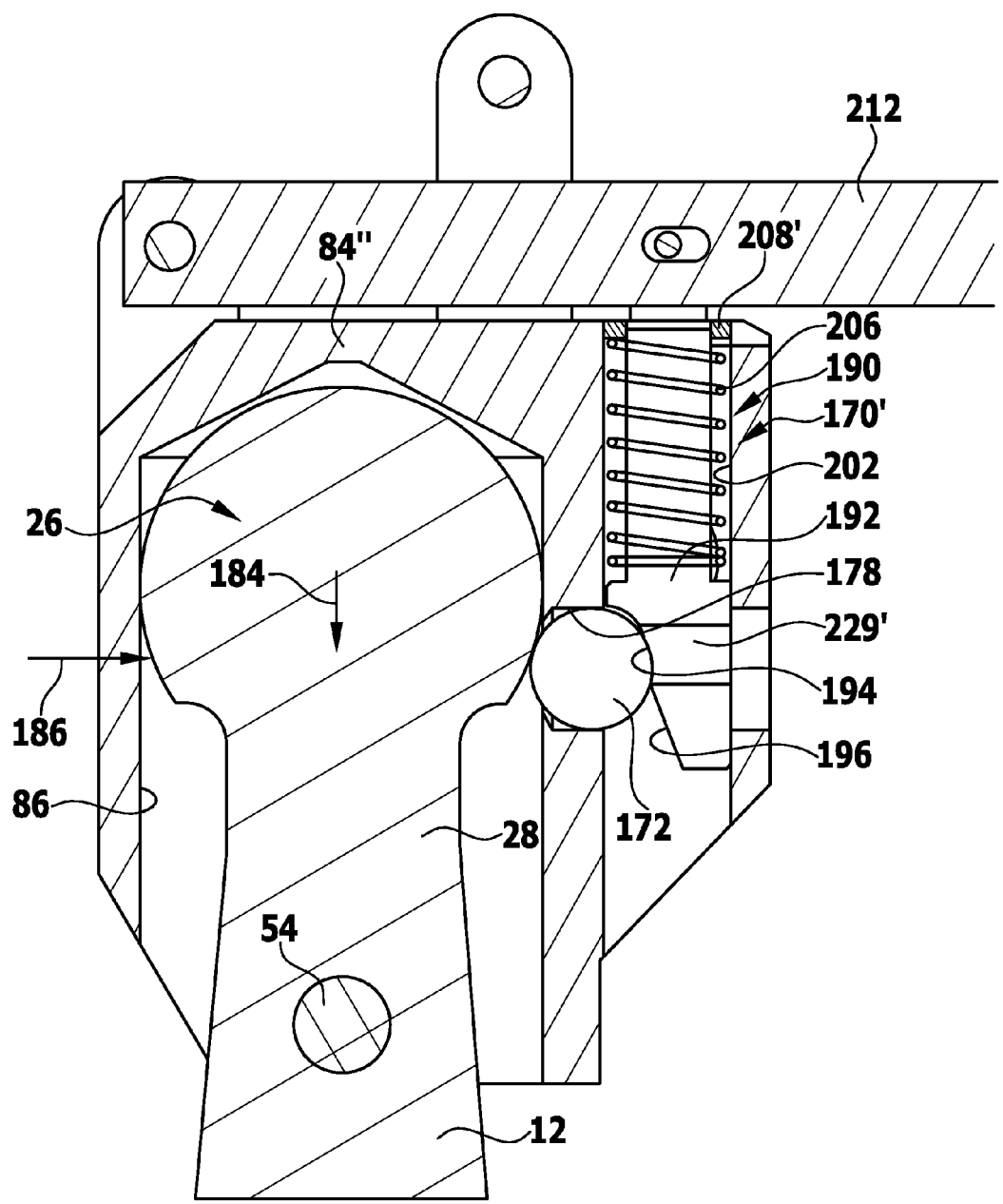
FIG. 10 is a representation similar to FIG. 6 of a third exemplary embodiment of a load carrier holding arrangement according to the invention in the load carrier holding position and the fixing position.

When, as shown in FIG. 7, the coupling ball 26 in the ball seat 86 of the housing body 84 reaches an end position corresponding to the load carrier holding position in this case, then this is detected by the sensing device 240, since the coupling ball 26 presses against the sensing tip 242 of the sensing pin 238 and moves the sensing pin 238 in the direction of the guideway 234, which causes the track follower 236 to co-operate with the guideway 234 in such a manner that the locking slide 230 effects a displacement of the locking slide 222 from the locking position shown in FIG. 9 into the lock release position shown in FIG. 7.

The locking slide 222 is then in this lock release position with the slide lug 224 laterally next to the support face 228, so that the release element 212 can move freely from its actuated position into the non-actuated position.

Therefore, so long as the coupling ball 26 is in its load carrier holding position in the ball seat 86, the sensing device 240 ensures with the locking control 230 that the locking slide 222 is in its non-locking position and therefore the slide lug 224 cannot cause any hindrance to the movement of the release element 212.

Only when the load carrier arrangement 50 is lifted in a contrary direction to the attachment direction 82, is this detected by the sensing device 240 and indicated to the locking control 230 so that the locking slide 222 is released and can move into the locking position.

This occurs in particular as a result of the sensing pin 238 releasing with the track follower the movement of the locking slide 22 into the locking position shown in FIG. 9, in which the slide lug 224 then co-operates with the support face 228 to hold the release element that is in the actuated position in the actuated position and thus also forcibly hold the wedge body 192 in its release position.

The advantage of the fixing device 170 combined with the release position lock 220, the locking control 230 and the sensing device 240 is that this makes it possible to hold the wedge body 192 in the release position when the load carrier holding arrangement 50 is removed from the ball neck 12 and the coupling ball 26, so that when it is attached once again to the ball neck 12 with the coupling ball 26 with the ball seat 86, the load carrier holding arrangement 50 can once again receive the coupling ball 26 and this can move into the load carrier holding position without there being any hindrance to the movement of the coupling ball 26 in the ball seat by the fixing element 172.

Moreover, shortly before the coupling ball 26 in the ball seat 86 reaches the load carrier holding position, this is detected by the sensing device 240 and the release position lock 220 is moved by the locking slide control 230 into the lock release position so that the fixing device 170 can move with the fixing element 172 into the fixing position.

In detail, this occurs by actuating the sensing pin 238, so that the track follower 236 of the sensing pin 238 co-operates with the guideway 234 and displaces the locking slide 222 again into the lock release position according to FIG. 7, as a result of which the slide lug 224 releases the movement of the release element 212 and thus by the action of the resilient element 206 ? the release element 212 together with the wedge body 192 to move from the release position into the fixing position, in which the wedge face 194 moves the fixing element 172 so far in the direction of the coupling ball 26 that in its fixing position this prevents the load carrier holding arrangement 50 from being released from the ball neck 12 with the coupling ball 26.

Thus, the locking control 230 and the sensing device 240 form a lock release arrangement 250 for the release position lock 220, which is always operative when the coupling ball 265 is in the load carrier holding position.

However, because the fixing element 172 continues to be acted on by the wedge face 194 and the wedge face 194 is subject to the action of force of the resilient element 206, the fixing element 172 in the fixing position experiences a constant application of force in the transverse direction 182, i.e. in the direction of the coupling ball, and thus generates a clamping force 186, which acts on the coupling ball 26 transversely to the attachment force 184 and transversely to the attachment direction 82 and which places the coupling ball 26 against a side of the ball guide face 92 located opposite the fixing element 172 and thus braces the coupling ball 26 and the housing body 84 together with the fixing element 172 in relation to one another, so that any play of the coupling ball 26 in the ball seat 86 still present is eliminated by this clamping force 186.

Since at the same time the attachment force 184 also acts on the positioning retaining element 104 and presses this against the positioning body 54, in particular with the support face regions 122 and 124 against the positioning face regions 72 and 74, a substantially play-free clamping of the housing body 84 relative to the ball neck 12 with the coupling ball 26 can be achieved.

In the second exemplary embodiment the release element 212 in the form of the release lever is preferably arranged in such a manner that a force KL necessary to move this from the non-actuated position, shown in broken lines in FIG. 8, into the actuated position, shown in solid lines in FIG. 8, not only moves the release lever, but at the same time also leads to a total action of force on the load carrier holding arrangement, which acts in a contrary direction to the attachment direction 82, so that with a sufficiently stable configuration of the operating device 190 the force KL can also be used at the same time to lift the load carrier holding arrangement 50 from the ball neck 12 with the coupling ball 26, after moving the operating device 190 into the release position, to enable the load carrier 40 to be lifted more easily during removal thereof from the ball neck 12 with the coupling ball 26.

In a third exemplary embodiment of a load carrier holding arrangement 50 according to the invention shown in FIGS. 10 to 15, the ball neck 12 with the coupling ball 26 and also the housing body 84" with the ball seat 86 are configured in the same manner as described in the first and second exemplary embodiments.

In addition, the positioning bodies 54 and the positioning retaining elements 104 are also configured in the same manner as described in association with the first and second exemplary embodiments, and therefore reference can be made in full to the explanations regarding the first and second exemplary embodiments.

Moreover, in the third exemplary embodiment the fixing device 170' is configured in substantially the same manner as in the second exemplary embodiment, in particular the fixing element 172 in the guide bore 178 and also the wedge body 192 with the wedge face 194 are configured in the same manner as described in association with the second exemplary embodiment.

The release element 212 is also formed as a lever and co-operates with the wedge face 192, so that the same functions during actuation of the release element 212 result as described in association with the first exemplary embodiment.

The only difference from the second exemplary embodiment is that the resilient element 206 together with the wedge body 192 is arranged in a part of the wedge guide 202 and that the support bearing 208' is formed as a ring, which surrounds the wedge body 192 and forms a counter-bearing for the resilient element 206 and which forms an additional guide for the wedge body 192.

Furthermore, the interaction of the wedge body 192 with the fixing element 172 is also identical to that described in association with the second exemplary embodiment, wherein the resilient element 206 also exhibits the same effect as that explained in association with the second exemplary embodiment.

However, the release position lock 220' is configured differently in the third exemplary embodiment.

Figure 11:
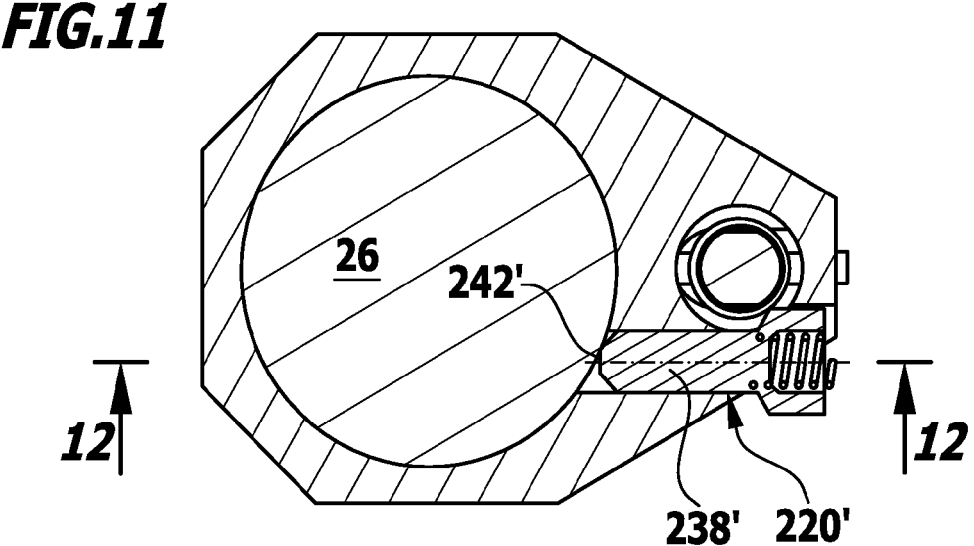
FIG. 11 shows a section taken along line 11-11 in FIG. 12.
Figure 12:
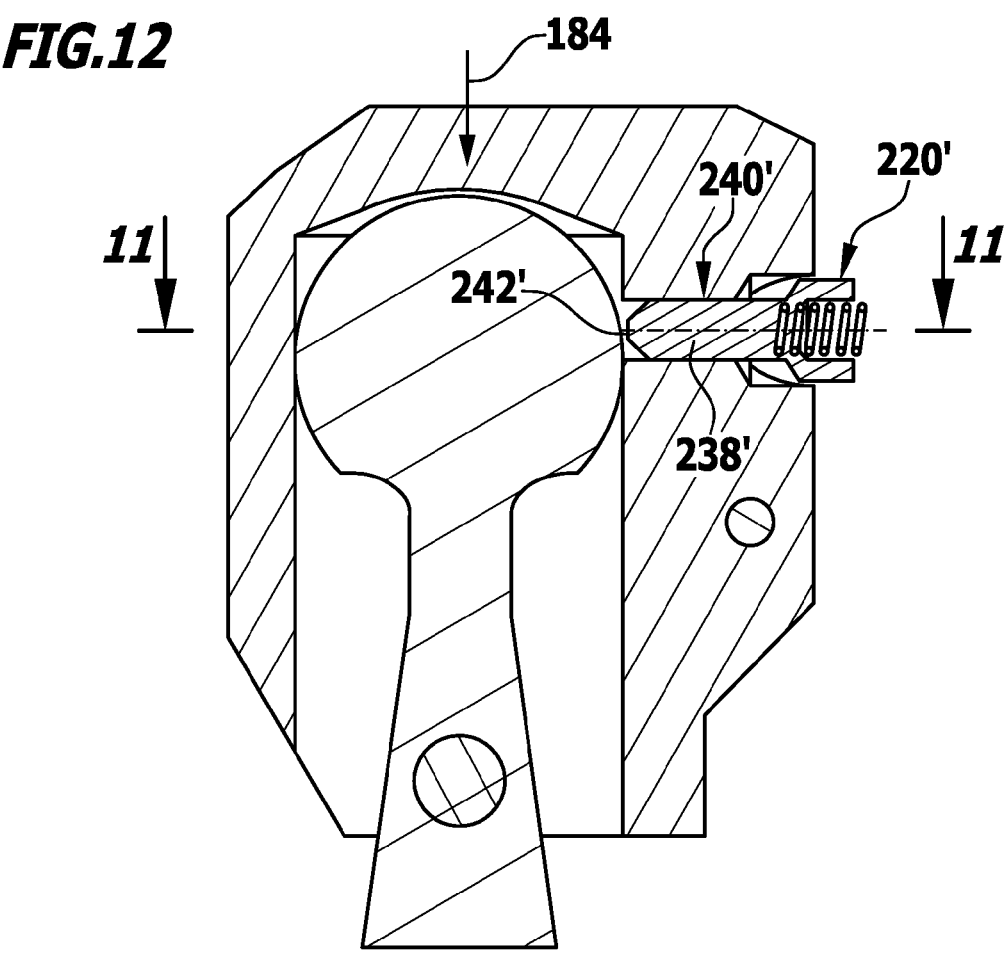
FIG. 12 shows a section taken along line 12-12 in FIG. 11.

The release position lock 220' also comprises as sensing device 230' a sensing pin 238, which detects the presence of the coupling ball 26 in the load carrier holding position with a sensing tip 242 and in this load carrier holding position displaces the sensing pin 238 into a lock release position, as shown in FIGS. 11 and 12, whereas when the coupling ball 26 has left the load carrier holding position, the sensing pin 238 with the sensing tip 242 moves into the ball seat 86.

In this case, the sensing pin 238' is connected directly to the locking slide 222, so that the sensing pin 238' and the locking slide 222' move in combination.

Thus, in the third exemplary embodiment the sensing device 230' acts directly on the release position lock 220 and forms the lock release arrangement 250' on its own.

Figure 13:
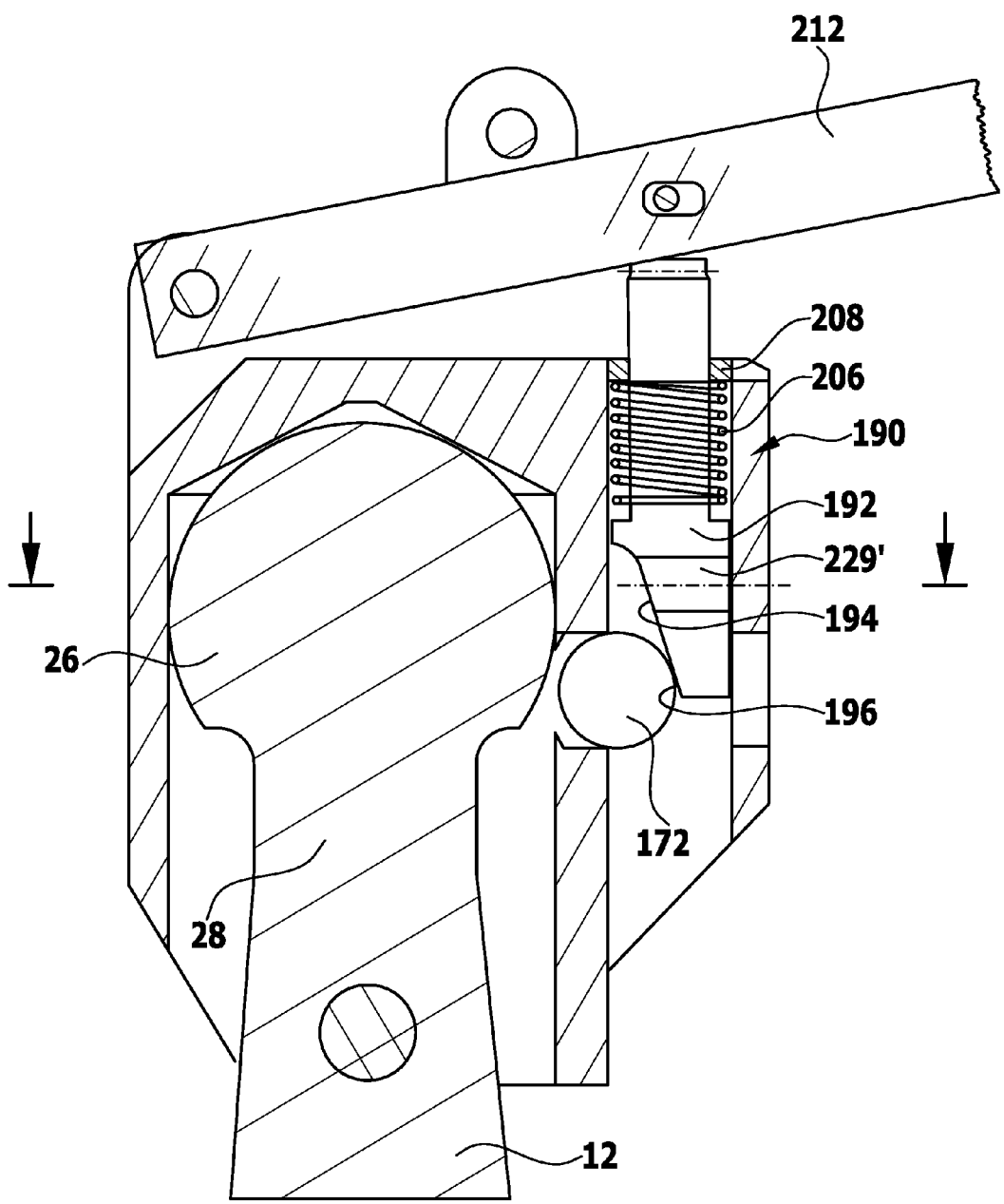
FIG. 13 is a representation similar to FIG. 10 of the load carrier holding arrangement in the release position.
Figure 14:
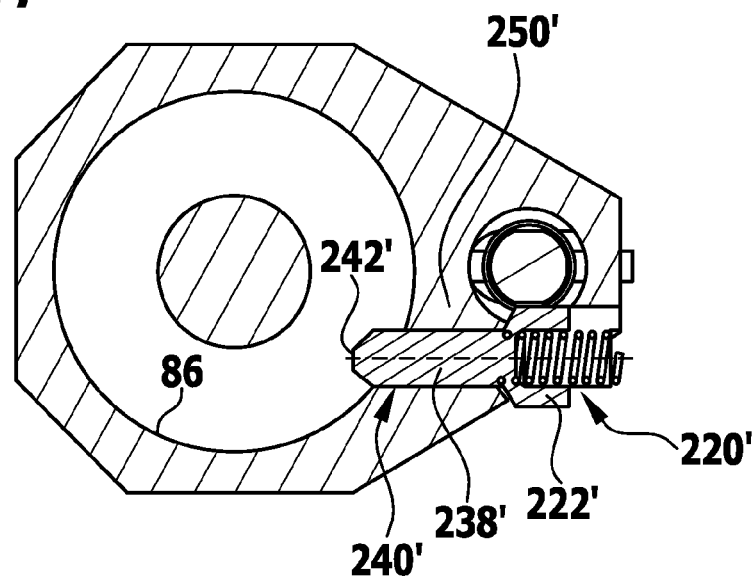
FIG. 14 shows a section similar to FIG. 11 after the load carrier holding arrangement has left the load carrier holding position.
Figure 15:
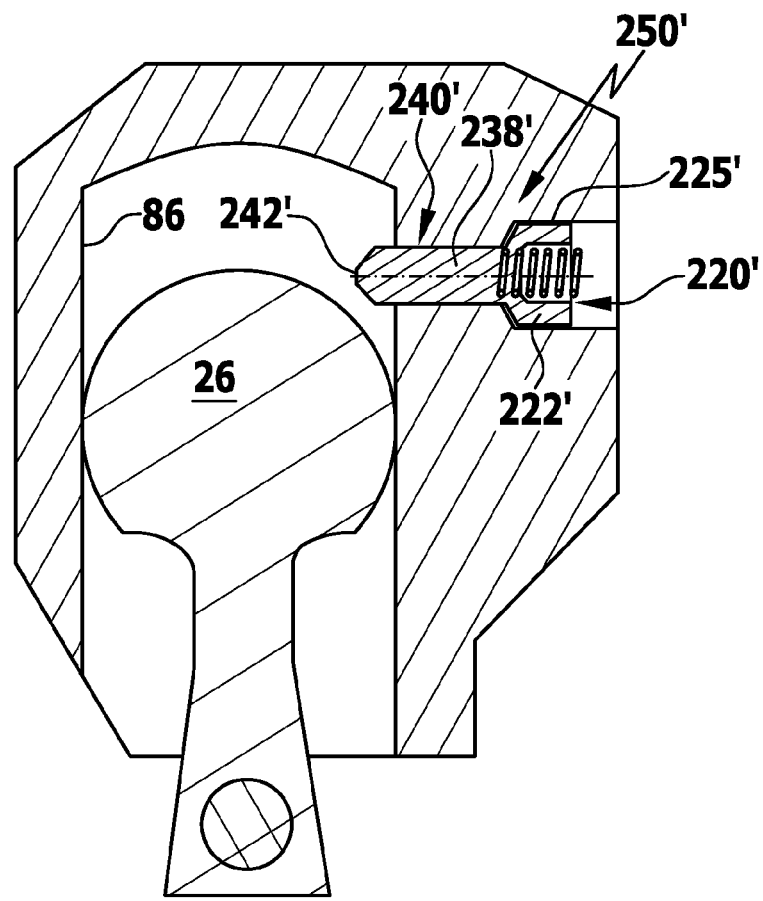
FIG. 15 shows a section similar to FIG. 12 after the load carrier holding arrangement has left the load carrier holding position.

In the third exemplary embodiment the locking slide 222' is configured as a cylindrical body, the cylinder shell surface 225' of which is capable of moving into a lateral recess 229' of the wedge body 192 when the wedge body 192 is in the release position and when the coupling ball 26 has left the load carrier holding position, as is shown in FIGS. 13, 14 and 15, so that the locking slide 221 is then in a locking position.

In this locking position, with interaction between the peripheral face 225' and the recess 229', the locking slide 222' then causes a blocking of the wedge body 192, so that the resilient element 206 can no longer move the wedge body 192 from the release position into the fixing position.

Only when an actuation of the sensing tip 242' of the sensing pin 238' occurs by the coupling ball 26 that has moved into the ball seat 86 on reaching the load carrier holding position does the sensing pin 238 displace the locking slide 222' from the locking position blocking the movement of the wedge body 192 into the lock release position shown in FIGS. 11 and 12, so that the wedge body 192' can then in turn move from the release position into the fixing position under the action of the resilient element 206' and the fixing element 172 can move in the direction of the coupling ball 26.

Otherwise, the function of the third exemplary embodiment is identical to the function described in association with the second exemplary embodiment, and therefore reference can be made in full to the explanations regarding the second exemplary embodiment.

Figure 16:
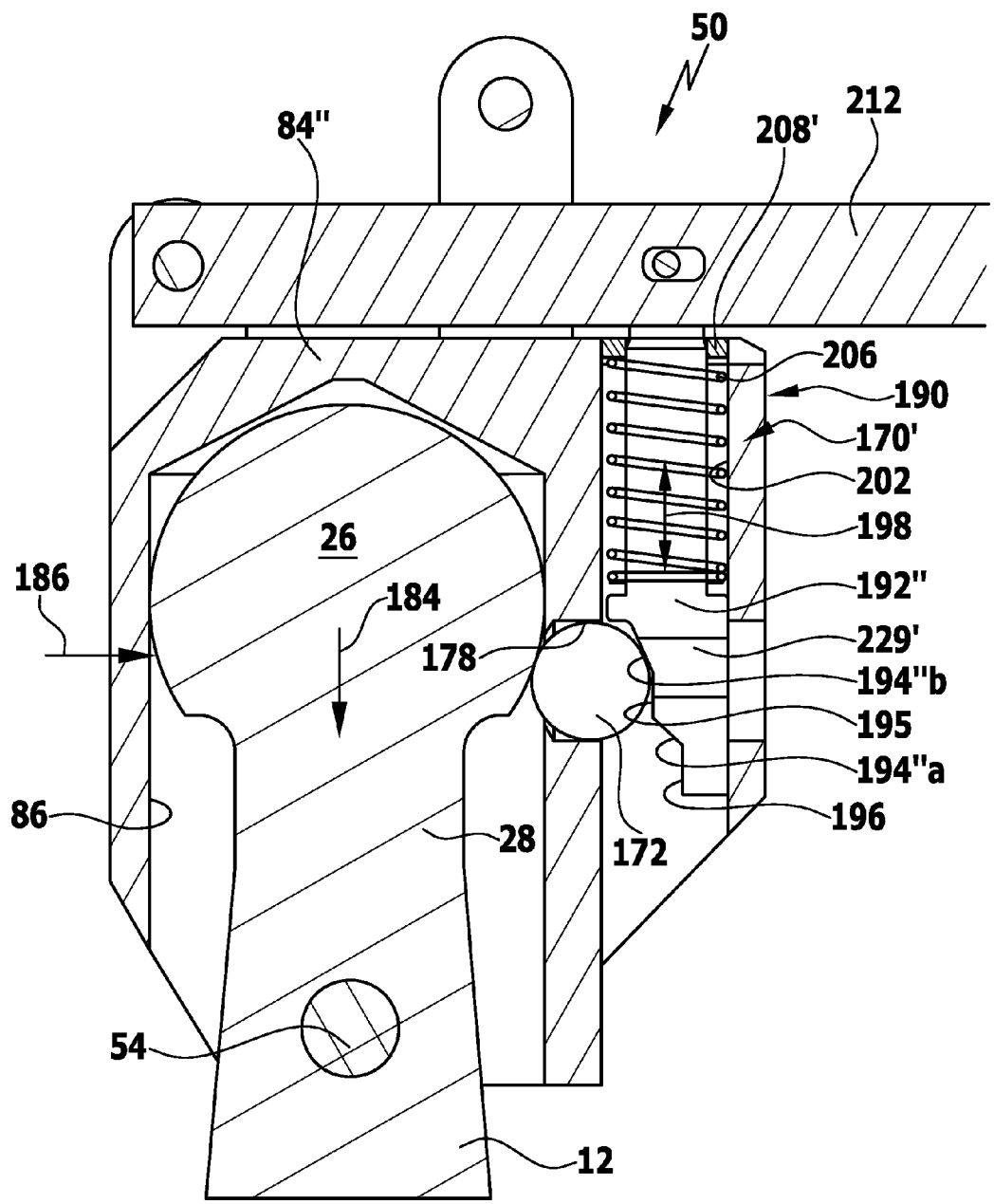
FIG. 16 shows a section similar to FIG. 10 through a fourth exemplary embodiment of a load carrier holding arrangement according to the invention.

In a fourth exemplary embodiment of a load carrier holding arrangement 50 according to the invention shown in FIG. 16, the wedge body 192" is configured differently, since two wedge faces 194"a and 194"b are provided, wherein the wedge face 194"a directly adjoins the retraction face 196 and runs with a steeper inclination to the displacement direction 198 than the wedge face 194"b, which runs with a lesser inclination to the displacement direction 198.

During the initial displacement of the wedge body 172 from the release position in the direction of the fixing position only a lower force is necessary starting from the retraction face 196, since during this displacement 172 the fixing element 172 does not yet abut against the coupling ball 26, so that the wedge face 192"a can have a steeper inclination to the displacement direction 198.

In the fixing position as high a force as possible should be applied to act on the fixing element 172 to enable this to act on the coupling ball 26 with as high a force as possible, so that wedge face 194"b has a lesser inclination to the displacement direction 198 than wedge face 194"a.

Moreover, preferably also provided between the first wedge face 194"a and the second wedge face 194"b is a locking face 195, which runs approximately parallel to the displacement direction 198 and which is arranged so that when the fixing element 172 abuts against the locking face 195, the fixing element 172 is already displaced so far in the direction of the coupling ball 26 that this secures the load carrier holding arrangement 50 against being lifted from the ball neck 12 with the coupling ball 26, while no clamping of the housing body 84 in relation to the ball neck 12 and the coupling ball 26 by the fixing element 172 has yet occurred.

This clamping is achieved by the wedge face 194"b, which for applying as high a force as possible to the coupling ball 26 has the lesser inclination relative to the displacement direction 198, so that a longer path of the wedge body 192 is necessary in the displacement direction to ultimately achieve the clamping of the coupling ball 26 in relation to the housing body 84 by means of the fixing element 172.

The locking face 195 has the advantage that even when the clamping should release because of substantial action of the forces, a further release of the fixture by acting forces is no longer possible, so that the fixture of the load carrier holding arrangement 50 on the ball neck 12 with the coupling ball 26 cannot be released on the basis of force.

Otherwise, all further elements of the fourth exemplary embodiment are identical to those of the third exemplary embodiment, and therefore reference can be made in full to the explanations regarding the third exemplary embodiment with respect to the entire description.

Figure 17:
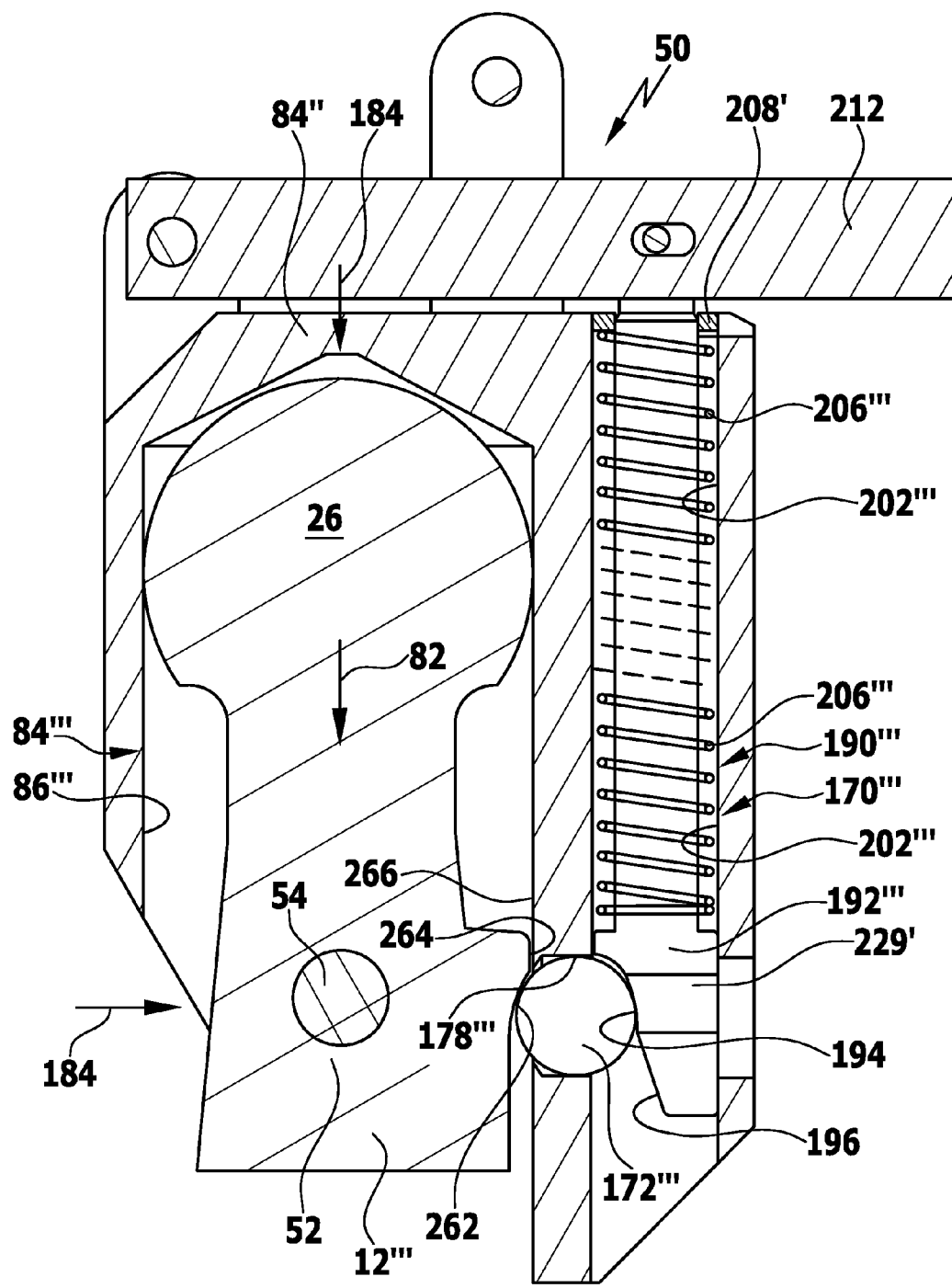
FIG. 17 shows a section similar to FIG. 10 through a fifth exemplary embodiment of a load carrier holding arrangement according to the invention.

In a fifth exemplary embodiment of a load carrier holding arrangement 50 according to the invention shown in FIG. 17, contrary to the third exemplary embodiment the fixing device 170''' is configured so that the fixing element 172''' does not act on the coupling ball 26 in its locked position, but on a fixing element seat of the ball neck 12''' formed as an undercut 173''', which is arranged, for example, on a side of the ball neck section 52 facing away from the motor vehicle body 20 that itself carries at least one positioning body 53.

In addition, the undercut 262 lies on a side facing away from the coupling ball 26 of a support face 164, which is formed by the ball neck section 52 and against which the housing body 84''' abuts with the ball seat 86''', wherein in the fifth exemplary embodiment the at least one positioning body 54 co-operates with the positioning retaining element 104 which is not shown in the graphical FIG. 17, in such a way that the housing body 84''' abuts with a part-region 266 of the ball seat 86 adjoining the guide bore 178'''.

In addition, the at least one positioning body 54 and also the positioning retaining element 104 are also arranged so that in the attached position of the housing body 84 the fixing element 172''' in its fixing position can abut against the undercut 262 and can therefore act on the housing body 84 with a force in the attachment direction 82 in the same manner as is the case in the third exemplary embodiment when the fixing element 172 rests against the coupling ball 26.

Otherwise, the fifth exemplary embodiment is configured in the same manner as the third exemplary embodiment or the preceding exemplary embodiments, and therefore reference can be made in full to the explanations regarding these exemplary embodiments with respect to the remaining features.

In a sixth exemplary embodiment of a load carrier holding arrangement 50 according to the invention shown in FIGS. 18 and 19, the housing body 84'''' is provided with the ball seat 86'''', which, as described in the preceding exemplary embodiments, extends from the seat opening 88'''' with the ball guide faces 92'''' to the end face 94'''', wherein in this exemplary embodiment the end face 94'''' has a conical shape and in the load carrier holding position sits on the coupling ball 26, in particular the ball surface 38 of the coupling ball 26, so that in this sixth exemplary embodiment the coupling ball 26 carries the housing body 84''''.

In the sixth exemplary embodiment the housing body 84'''' extends in the load carrier holding position with the ball guide faces 92'''' from the end face 94'''' in the attachment direction 82 both beyond the coupling ball 26 and also beyond the ball attachment piece 28 and also with the ball guide faces 92'''' engages around a collar 252 arranged on the ball neck attachment 52'''', which collar is arranged, for example, to directly adjoin the ball attachment piece 28 on the ball neck 12.

As shown in FIGS. 18 and 19, the collar 252 forms two positioning bodies 254a and 254b, which are arranged on opposite sides of the longitudinal centre plane 30 and in particular symmetrically thereto, and extend from the ball neck section 52'''' and transversely thereto and in this case have positioning faces 264a and 264b, wherein the positioning bodies 254a and 254b extend transversely to the ball neck section 52'''' so far that the positioning faces 264a and 264b lie outside the projection contour of the coupling ball 26 onto the positioning bodies 254a and 254b.

In particular, the positioning faces 264a and 264b lie on an outer surface 255 of the respective positioning body 254a, 254b remote from the ball neck section 52'''' and preferably extend parallel to the attachment direction 82, so that all the positioning faces 264a and 264b form guide face regions 276a, 276b, which guide the housing body 84'''' during attachment onto the ball neck 12 with the coupling ball 26 parallel to the attachment direction 82, wherein the ball guide faces 92'''' can run with play relative to the guide face regions 276a, 276b.

However, the guide face regions 276a, 276b have a course that deviates from the rotationally symmetrical course to the centre axis 32.

For example, the guide face regions 276a and 276b run parallel to one another with positioning face region sections 277a, 277b and in particular parallel to the longitudinal centre plane 30 of the ball neck 12 and with a guide face cross-section 278a, 278b transversely to the guide face sections 277a, 277b and transversely to the longitudinal centre plane 30, wherein the guide face cross-sections 278a and 278b preferably merge into one another.

The guide face cross-sections 278a, 278b preferably lie on a side of the ball neck section 52"" facing the ball neck support 16 side of the ball neck section 52"" and facing the rear part 18 of the motor vehicle body 20.

Moreover, on their side facing away from the ball neck support 16 or from the rear part 18 of the motor vehicle body 20 the guide face regions 276a, 276b bear wedging face sections 279a, 279b, which run at an angle to the longitudinal centre plane 30 and extend in planes VEa, VEb, which form with one another an angle of less than 120°, preferably less than 100°, even better less than 90°.

In particular, the guide face regions 276a, 276b are part-faces of a geometric, in this case polygonal, cylinder 280, which does not intersect the ball neck section 54"".

In this sixth exemplary embodiment with the ball guide faces 92"" the housing body 84"" forms positioning retaining elements 304a, 304b, which with their seat faces 314a, 314b are oriented towards the positioning faces 264a, 264b of the positioning bodies 254a, 254b.

In particular, the course of the seat faces 314 is adapted to the course of the positioning faces 264.

Moreover, the seat faces 314 comprise guide face regions 326, 326b, which have guide face sections 327a, 327b oriented towards the guide face sections 277a, 277b, guide face cross-sections 328a, 328b, which are oriented towards the guide face cross-sections 278a, 278b, and wedging face sections 329a, 329b, which are oriented towards the wedging face sections 279a, 279b.

As a result of the clearance between the positioning faces 264a, 264b and the seat faces 314a, 314b there is the possibility of moving the housing body 84"" with play relative to the positioning bodies 254a, 254b.

However, the clearance is low enough that the positioning bodies 254a, 254b co-operate with the positioning retaining elements 304a, 304b in such a manner that rotation around a rotational axis D of the housing body 84"" running approximately parallel to the attachment direction 82 in relation to the ball neck 12 with the positioning bodies 254a, 254b is not possible. Therefore, already by their arrangement forming an interlocking arrangement the positioning retaining elements 304a, 304b arranged with a clearance relative to the positioning bodies 254a, 254b prevent relative rotation of the housing body 84"" about a rotational axis oriented approximately parallel to the attachment direction 82.

Moreover, despite the play the positioning faces 264a, 264b co-operating with the seat faces 314a 314b prevent appreciable tilting of the housing body 84"" around tilt axes KAK running transversely to the centre axis 32 of the coupling ball 26 relative to the ball neck 12 and the coupling ball 26.

To remove the play between the positioning bodies 254a, 254b and the positioning retaining elements 304a, 304b as far as possible, a clamping force 186 can be applied in the transverse direction 182 to the housing body 84"", wherein the application of the clamping force in the transverse direction 182 is directed away from the sides of the positioning bodies 254a, 254b that bear the wedging face sections 279a, 279b, so that with the application of force the wedging face sections 329a, 329b of the positioning retaining elements 304a, 304b come into abutment against the wedging face sections 279a or 279b and thus cause a low-play or play-free positioning of the positioning retaining elements 304a, 304b relative to the positioning bodies 254a, 254b, whereby only the wedging face sections 329a, 329b on the positioning retaining element 304a, 304b abut against the wedging face sections 279a, 279b of the positioning bodies 254a, 254b.

This clamping force 186 is produced by the fixing device 170"" with the fixing element 172"", which in this case engages into the fixing element seat 173"", which is arranged on the collar 252, i.e. in the region of the guide face cross-sections 278a, 278b, e.g. in the form of a recess or undercut, and is configured so that by interaction with the fixing element 172"" the fixing element seat 173"", on the one hand, produces the attachment force 184 in order to act on the housing body 84"" in the direction of the attachment direction and, on the other hand, produces the clamping force 186 in order to act on the housing body 84"" in the transverse direction 182.

Thus, the fixing element 174"" serves, on the one hand, to fix the housing body 84"" relative to the ball neck 12 and to the coupling ball 26 and, on the other hand, to fix the housing body 84"" in a low-play or play-free manner to the positioning retaining elements 304a, 304b relative to the positioning bodies 254a, 254b and, moreover, to secure the housing body 84"" against being lifted from the ball neck 12 with the coupling ball 26.

In particular, the fixing device 170"" is configured in the same manner as, for example, the fixing device 170' of the third exemplary embodiment or the fixing device 170" of the fourth or also the fifth exemplary embodiment of the load carrier holding arrangement according to the invention, and therefore reference can be made in full to the explanations regarding the preceding exemplary embodiments, in particular to the explanations regarding the third and/or fourth and/or fifth exemplary embodiment of the load carrier holding arrangement with respect to all further features and properties.

In particular, in the sixth exemplary embodiment the fixing device 170"" is also provided with an operating device 190 as well as a release position lock 220 configured in accordance with the third and fourth exemplary embodiment, and also a sensing device 240, which detects the position of the collar 252, for example, and a lock release arrangement 250, which are configured in the same manner as in the third or fourth exemplary embodiment.

In a seventh exemplary embodiment shown in FIG. 20, the housing body 84"", the positioning bodies 254a, 254b and also the positioning retaining elements 304a, 304b are configured in the same manner as in the sixth exemplary embodiment, and therefore reference can be made in full to the explanations regarding the sixth exemplary embodiment with respect to this.

The difference between the seventh and the sixth exemplary embodiments lies solely in the configuration of the fixing device 370, which in this case comprises an eccentric body 372, which is mounted on the housing body 84"" to be rotatable around an eccentric axis 374, wherein the eccentric axis 374 extends e.g. transversely, in particular perpendicularly, to the longitudinal centre plane 30.

In particular, the eccentric axis 374 runs parallel to the guide face sections 278a and 278b of the positioning bodies 254a, 254b.

The eccentric body 372 is movable into an eccentric seat 373 of the collar 252 or the positioning bodies 254a, 254b or is movable out of this eccentric seat 373 in order to achieve a fixing of the housing body 84"" relative to the ball neck 12 and the coupling ball 26.

In this case, the eccentric body 372 acts in the same manner as the fixing element 172"" of the fixing device 170"" as described, for example, in association with the sixth exemplary embodiment, i.e. in its fixing position, in which it engages into the eccentric seat 373 of the collar 252 or the positioning bodies 254a, 254b, the eccentric body 372, on the one hand, causes the housing body 84'''' to be acted on in the transverse direction 182 and, on the other hand, the housing body 84'''' to be acted on in the attachment direction 82, so that the attachment force 184 and the clamping force 186 can thus be produced and therefore the same functionalities can also be achieved as in the sixth exemplary embodiment.

Reference can likewise be made in full to the explanations regarding the sixth exemplary embodiment or to the other preceding exemplary embodiments in this respect.

For example, the eccentric body 372 can be rotated around the eccentric axis 374 by providing an actuating linkage 380, which has a release element 382, which can be actuated in accordance with the release elements that have been described in association with the preceding exemplary embodiments.

Figure 21:
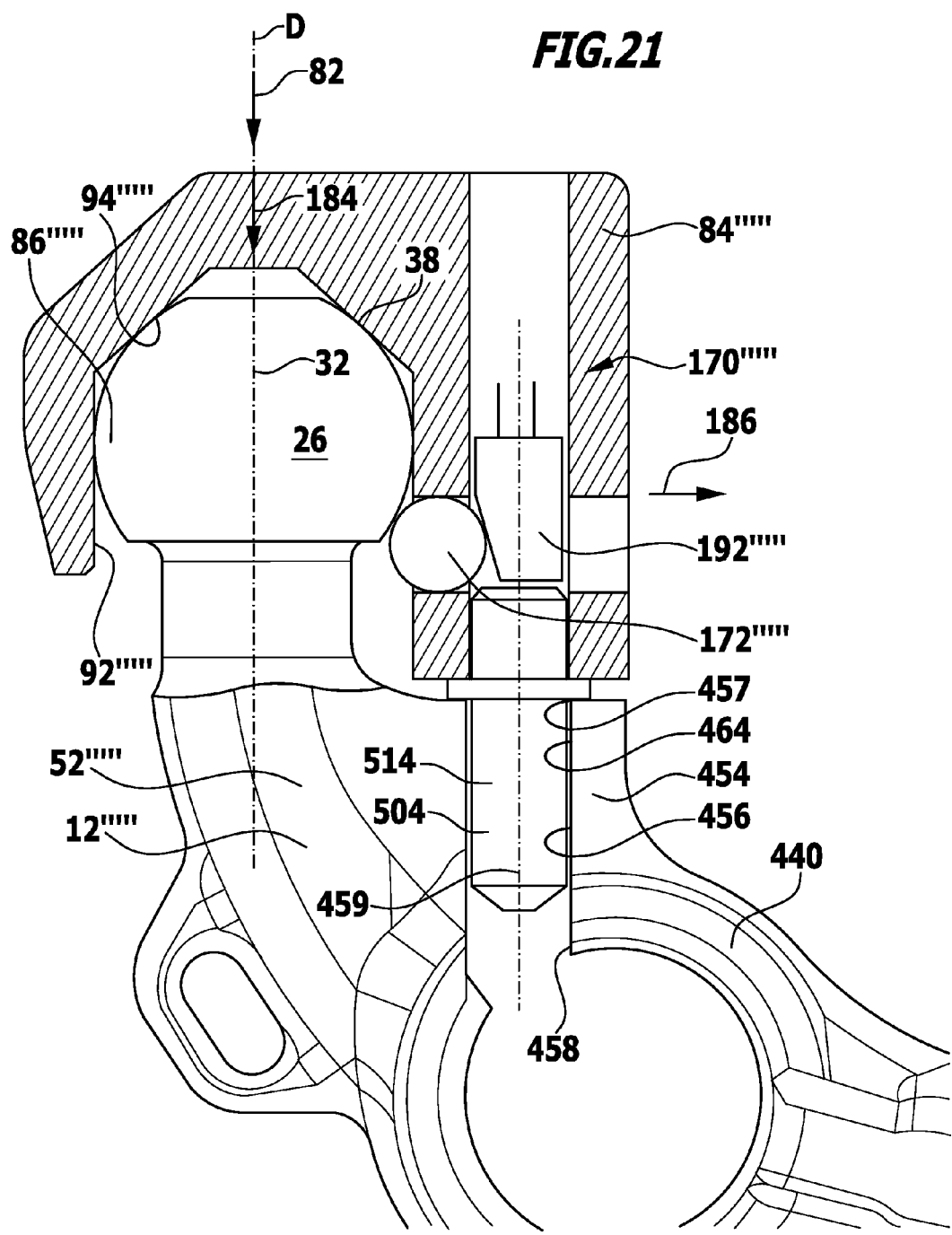
FIG. 21 shows a section similar to FIG. 10 through an eighth exemplary embodiment of a load carrier holding arrangement according to the invention.

In an eighth exemplary embodiment shown in FIG. 21, the housing body 84'''' comprises the ball seat 86'''', which has both the ball guide face 92'''' and the end face 94'''', wherein in the load carrier holding position the end face 94'''' sits on the ball surface 38 of the coupling ball 26.

Moreover, in the same manner as in the third or fourth exemplary embodiment, the housing body 84'''' is provided with the fixing device 170'''', which is configured in the same manner as in the third or fourth exemplary embodiment, wherein the fixing element 172'''' acts on the coupling ball 26 in the same manner as in the third exemplary embodiment.

In contrast to the exemplary embodiments described hitherto, the ball neck 12'''' is provided with positioning bodies 454, which are separated by the longitudinal centre plane 30 and which extend transversely to the course of the ball neck 12, in particular the ball neck section 52'''', and are moulded onto the ball neck section 52'''' and a plug socket 440, for example. In this case, the positioning bodies 454 have positioning faces 464 located on the inside, which are formed by a bore 456 inserted into the positioning bodies 454, wherein the bore 456 has an opening 457 directed towards the housing body 84'''', when this is arranged in the load carrier holding position and receives the coupling ball 26 at the ball seat 86''''.

In particular, with a centre axis 459 the bore 456 preferably runs parallel to the centre axis 32 of the coupling ball 26 and also in particular parallel to the attachment direction 82, wherein a cylinder surface 458 of the bore 456 intersects the ball neck 12.

In this eighth exemplary embodiment the positioning retaining elements 504 are also separated by the longitudinal centre plane and are configured, for example, by a projection, which extends from the housing body 84'''', i.e. parallel to the attachment direction 82, so that the projection is able to engage into the bore 456 of the positioning body 454 and with its seat faces 514 is able to co-operate with the positioning faces 464 of the positioning elements 454.

In this case, both the positioning faces 464 of the positioning bodies 454 and the seat faces 514 of the positioning retaining elements 504 solely have guide face regions, which run parallel to the attachment direction 82, so that with its seat faces 514 the positioning retaining element 504 can co-operate ? the positioning faces 464 of the positioning body 454 during attachment of the housing body 84'''' onto the coupling ball 26, namely by the projection forming the positioning retaining elements 504 engaging into the bore 456 to thus prevent tilting movements of the housing body 84'''' relative to the coupling ball 26 around tilt axes KAK running transversely to the centre axis 82 and rotational movements thereof around the rotational axis D oriented approximately parallel to the attachment direction 82.

As described in the preceding exemplary embodiments, the fixing element 172'''' also serves to make the clearance between the positioning bodies 454 and the positioning retaining elements 504 low-play or play-free in that the fixing element 172'''' not only produces the attachment force 184, which is directed parallel to the attachment direction 82, but also the clamping force 186, which serves to remove the play between the positioning faces 464 and the seat faces 514.

The invention claimed is:

1. A trailer coupling for motor vehicles comprising: a ball neck, which is mountable at a first end on a rear part of a motor vehicle to be fixed to the vehicle by means of a ball neck holder and which carries a coupling ball at a second end,
   at least one positioning body arranged on one side of a longitudinal center plane of the ball neck and on the ball neck at a defined spacing from the coupling ball to position a load carrier holding arrangement attachable to the coupling ball and the ball neck, the load carrier holding arrangement mounting over and axially receiving the coupling ball and the at least one positioning body, the at least one positioning body located vertically below the coupling ball and permanently fixed to a ball neck section aligned with a center axis of the coupling ball, the at least one positioning body extending transversely to the center axis and from the ball neck section to a lateral end face of the at least one positioning body, the at least one positioning body having an outermost circumferential surface defining at least one positioning face,
   wherein the at least one positioning face is located between the ball neck section and the lateral end face and supporting the load carrier holding arrangement when receiving the at least one positioning body; and
   wherein the at least one positioning face lies outside a projection contour of the coupling ball, the projection contour is formed by projection of the coupling ball onto the positioning body.

2. The trailer coupling according to claim 1, wherein the at least one positioning body is arranged on the ball neck section of the ball neck, which adjoins a ball attachment piece of the ball neck that carries the coupling ball.

3. The trailer coupling according to claim 1, wherein the at least one positioning body has positioning faces arranged on opposite sides.

4. The trailer coupling of claim 1, wherein the coupling ball defines an equatorial plane passing through a center of the coupling ball and perpendicular to a center axis of the coupling ball, a diameter of the coupling ball being located on the equatorial plane and passing through the center of the coupling ball, and wherein a distance between the positioning body on the ball neck and the center of the coupling ball is less than 1.5 times the diameter of the coupling ball.

5. The trailer coupling according to claim 1, wherein the at least one positioning face extends transversely to the longitudinal center plane.

6. The trailer coupling according to claim 1, wherein the at least one positioning face intersects the ball neck section carrying the at least one positioning body.

7. The trailer coupling according to claim 1, wherein the at least one positioning body is cylindrical and has an outermost cylindrical surface, the outermost cylindrical surface defining the outermost circumferential surface of the at least one positioning face.

8. A trailer coupling for motor vehicles comprising:
a ball neck, which is mountable at a first end on a rear part of a motor vehicle to be fixed to the vehicle by means of a ball neck holder and which carries a coupling ball at a second end,
a first positioning body arranged on the ball neck at a defined spacing from the coupling ball to position a load carrier holding arrangement attachable to the coupling ball and the ball neck, the load carrier holding arrangement mounting over and axially receiving the coupling ball and the first positioning body, the first positioning body located vertically below the coupling ball and fixed to a ball neck section aligned with a center axis of the coupling ball, the first positioning body extending transversely to the center axis and from the ball neck section to a lateral end face of the first positioning body, the first positioning body having an outermost circumferential surface defining a first positioning face,
wherein the first positioning face is located between the ball neck section and the lateral end face and supporting the load carrier holding arrangement when receiving the first positioning body,
wherein a second positioning body is arranged on the ball neck section on an opposite side of the ball neck as the first positioning body, the second positioning body having an outermost circumferential surface defining a second positioning face, the first and second positioning bodies arranged symmetrical to a longitudinal center plane of the ball neck.

9. The trailer coupling according to claim 8, wherein the first and second positioning faces extend transversely to the longitudinal center plane.

10. A trailer coupling for motor vehicles comprising:
a ball neck, which is mountable at a first end on a rear part of a motor vehicle to be fixed to the vehicle by means of a ball neck holder and which carries a coupling ball at a second end,
at least one positioning body arranged on the ball neck at a defined spacing from the coupling ball to position a load carrier holding arrangement attachable to the coupling ball and the ball neck, the load carrier holding arrangement mounting over and axially receiving the coupling ball and the at least one positioning body, the at least one positioning body located vertically below the coupling ball, and permanently fixed to a ball neck section aligned with a center axis of the coupling ball, the at least one positioning body extending transversely to the center axis and from the ball neck section to a lateral end face of the at least one positioning body, the at least one positioning body having an outermost circumferential surface defining at least one positioning face, wherein the at least one positioning face is located between the ball neck section and the lateral end face and supporting the load carrier holding arrangement when receiving the at least one positioning body, the at least one positioning body having a longitudinal axis that extends away from the ball neck section in a direction of extent which runs transversely to a longitudinal center plane of the ball neck and intersects the lateral end face without intersecting the at least one positioning face;
the at least one positioning face lies outside a projection contour of the coupling ball, the projection contour is formed by projection of the coupling ball onto the positioning body.

11. The trailer coupling according to claim 10, wherein the direction of extent of the at least one positioning body extends transversely to the ball neck section carrying the positioning body.

12. A load carrier holding arrangement comprising:
a housing body having a cavity defining a ball seat for a coupling ball of a ball neck of a trailer coupling, the housing body defining an opening sized for receiving the coupling ball therethrough along an attachment axis; and
at least one positioning retaining element being fixedly connected to the housing body, the at least one positioning retaining element being laterally offset from the attachment axis and outwardly positioned from the opening and which is configured to cooperate with a positioning body, the at least one positioning retaining element being axially offset from the ball seat toward the opening sized for receiving the coupling ball, the at least one positioning retaining element including a seat opening configured to axially receive the positioning body while axially mounting to the housing body on the coupling ball, the positioning body permanently fixed to the ball neck section and extending transversely from the ball neck section carrying the positioning body to a lateral end face of the positioning body and the positioning body having an outermost circumferential surface defining at least one positioning face, the at least one positioning face located between the ball neck section and the lateral end face and received in the seat opening of the at least one positioning retaining element to support the load carrier holding arrangement, the at least one positioning face lies outside a projection contour of the coupling ball, which is formed by projection of the coupling ball onto the positioning body.

13. The load carrier holding arrangement according to claim 12, wherein the at least one positioning retaining element co-operates with the positioning body, in particular with the formation of an interlocking arrangement, in such a manner that the housing body is fixed against tilting movements around tilt axes running transversely, in particular perpendicularly, to the centre axis of the coupling ball relative to the ball neck.

14. The load carrier holding arrangement according to claim 12, wherein the at least one positioning retaining element has two seat faces facing towards one another.

15. The load carrier holding arrangement according to claim 12, wherein the respective positioning body with its region bearing the positioning face is arranged in a load carrier holding position between seat faces of the at least one positioning retaining element.

16. The load carrier holding arrangement according to claim 12, wherein the at least one positioning retaining element has seat faces, which extend facing one another and between which a positioning body is arranged in the load carrier holding position.

17. The load carrier holding arrangement according to claim 12, wherein the load carrier holding arrangement has a fixing device that fixes the housing body on the ball neck.

18. The load carrier holding arrangement according to claim 17, wherein the fixing device has a fixing element, which fixes the housing body relative to the ball neck in the load carrier holding position.

19. The load carrier holding arrangement according to claim 18, wherein the fixing element co-operates with the coupling ball in such a manner that the housing body is subjected to an attachment force relative to the coupling ball in the attachment direction.

20. The load carrier holding arrangement according to claim 18, wherein the fixing element co-operates with the coupling ball in such a manner that the housing body experiences a clamping force directed transversely to the attachment direction relative to the coupling ball.

21. The load carrier holding arrangement according to claim 18, wherein the fixing element engages on the positioning body in a fixing position.

22. The load carrier holding arrangement according to claim 21, wherein the fixing element engages behind the positioning body on a front side in the attachment direction.

23. The load carrier holding arrangement according to claim 22, wherein the fixing element is movably guided in a guide channel between the fixing position and a release position.

24. The load carrier holding arrangement according to claim 23, wherein the guide channel runs transversely to the ball seat.

25. The load carrier holding arrangement according to claim 18, wherein in a fixing position the fixing element acts on the coupling ball.

26. The load carrier holding arrangement according to claim 25, wherein in the fixing position the fixing element projects into the ball seat of the housing body.

27. The load carrier holding arrangement according to claim 18, wherein in the fixing position the fixing element is configured to be acted on by an operating device.

28. The load carrier holding arrangement according to claim 27, wherein the operating device comprises a wedge gear.

29. The load carrier holding arrangement according to claim 28, wherein the operating device comprises a spring-loaded wedge gear.

30. The load carrier holding arrangement according to claim 28, wherein the operating device comprises a release element.

31. The load carrier holding arrangement according to claim 30, wherein on actuation of the release element, the release element acts on the wedge gear and moves the wedge gear into a release position.

32. The load carrier arrangement according to claim 27, wherein the operating device is provided with a release position lock, which in a locking position holds the operating device in the release position.

33. The load carrier holding arrangement according to claim 32, wherein the release element acts in a blocking manner in the release position.

34. The load carrier holding arrangement according to claim 32, wherein in the locking position the release position lock acts in a blocking manner on the wedge gear in the release position.

35. The load carrier holding arrangement according to claim 32, wherein the release position lock is provided with a lock release arrangement, which impedes or cancels the locking position of the release position lock when, in the case where the load carrier holding arrangement sits on the ball neck with the coupling ball, the coupling ball and the ball neck are in the load carrier holding position relative to the ball seat.

36. The load carrier holding arrangement according to claim 32, wherein the release position lock moves automatically into the locking position when the operating device moves into the release position by actuation of the release element and the coupling ball in the ball seat is no longer in the load carrier holding position.

37. The load carrier holding arrangement according to claim 27, wherein a force acting to move the release element into its release position acts on the load carrier holding arrangement in a direction opposite to the attachment direction.

38. The load carrier holding arrangement according to claim 12, wherein the seat opening of the at least one positioning retaining element is U-shaped for receiving the outermost circumferential surface of the at least one positioning face.

39. A load carrier holding arrangement comprising:
a housing body having a cavity defining a ball seat for a coupling ball of a ball neck of a trailer coupling, the housing body defining an opening sized for receiving the coupling ball therethrough along an attachment axis;
a first positioning retaining element being fixedly connected to the housing body, the first positioning retaining element defining an opening sized for receiving therethrough a first positioning body arranged on the ball neck when the coupling ball is received through the opening of the housing body along the attachment axis;
a second positioning retaining element being fixedly connected to the housing body, the second positioning retaining element defining an opening sized for receiving therethrough a second positioning body arranged on the ball neck when the coupling ball is received through the opening of the housing body along the attachment axis; and
the first and second positioning retaining elements being arranged symmetrical to one another and to the attachment axis and configured to be symmetrical on a longitudinal center plane of the housing body.

40. A load carrier holding arrangement comprising:
a housing body having a cavity defining a ball seat for a coupling ball of a ball neck of a trailer coupling, the housing body defining an opening sized for receiving the coupling ball therethrough along an attachment axis;
a first positioning retaining element is fixedly connected to the housing body, the first positioning retaining element defining an opening sized for receiving therethrough a first positioning body arranged on the ball neck when the coupling ball is received through the opening of the housing body along the attachment axis;
a second positioning retaining element being fixedly connected to the housing body, the second positioning retaining element defining an opening sized for receiving therethrough a second positioning body arranged on the ball neck when the coupling ball is received through the opening of the housing body along the attachment axis; and
the first and second positioning retaining elements defining a positioning retaining axis extending transversely to the attachment axis, and configured to extend transversely to a longitudinal center plane of the housing body.

* * * * *